US008145634B2

(12) United States Patent
Hugley

(10) Patent No.: US 8,145,634 B2
(45) Date of Patent: Mar. 27, 2012

(54) PATENT MARKING SYSTEM

(75) Inventor: David G. Hugley, Austin, TX (US)

(73) Assignee: National Instruments Corporation, Austin, TX (US)

( * ) Notice: Subject to any disclaimer, the term of this patent is extended or adjusted under 35 U.S.C. 154(b) by 2820 days.

(21) Appl. No.: 10/059,948

(22) Filed: Jan. 29, 2002

(65) Prior Publication Data

US 2003/0144997 A1    Jul. 31, 2003

(51) Int. Cl.
*G06F 17/30* (2006.01)
(52) U.S. Cl. ........ 707/736; 707/770; 707/924; 709/203; 705/26.1; 705/14.51; 705/310; 717/168; 717/178
(58) Field of Classification Search ............. 707/2, 102, 707/100, 3–5, 10, 736, 769, 770, 923, 924, 707/930, 937, 999.003; 709/203; 705/26, 705/26.1, 14.51, 310; 717/168, 174, 178
See application file for complete search history.

(56) References Cited

U.S. PATENT DOCUMENTS

| | | | |
|---|---|---|---|
| 6,339,767 B1 * | 1/2002 | Rivette et al. ................. | 707/781 |
| 6,543,047 B1 * | 4/2003 | Vrhel et al. ................... | 717/121 |
| 6,556,992 B1 * | 4/2003 | Barney et al. ...................... | 707/6 |
| 6,721,946 B1 * | 4/2004 | Fogarty et al. ................ | 717/175 |
| 6,948,169 B1 * | 9/2005 | Amro et al. ................... | 717/178 |
| 7,716,060 B2 * | 5/2010 | Germeraad et al. .......... | 705/310 |
| 2002/0007373 A1 * | 1/2002 | Blair et al. .................... | 707/505 |
| 2002/0035571 A1 * | 3/2002 | Coult .......................... | 707/104.1 |
| 2002/0111824 A1 * | 8/2002 | Grainger .......................... | 705/1 |
| 2002/0138297 A1 * | 9/2002 | Lee .................................. | 705/1 |
| 2004/0088332 A1 | 5/2004 | Lee et al. | |
| 2004/0220842 A1 | 11/2004 | Barney | |
| 2008/0127329 A1 * | 5/2008 | Ogilvie ........................... | 726/17 |
| 2010/0100491 A1 * | 4/2010 | Frank et al. .................. | 705/310 |

FOREIGN PATENT DOCUMENTS

EP          1069520 A2 *  1/2001

OTHER PUBLICATIONS

Leah S. Larkey, "A Patent Search and Classification System", ACM 1999, pp. 179-187.*
Christian Collberg and Clark Thomborson, "Software Watermarking: Models and Dynamic Embeddings", ACM 1999, pp. 311-324.*
Acrobat 5.0.0 Mar. 22, 2001, p. 1, copyright 1987-2001.*
Adobe Systems (Adobe Acrobat 5.0) "Adobe PDFMaker Help", 2000, pp. 1-17.*
Adobe Acrobat 5.0, Classroom in a Book, pp. 1-38, 2001.*

* cited by examiner

*Primary Examiner* — Cheryl Lewis
(74) *Attorney, Agent, or Firm* — Meyertons Hood Kivlin Kowert & Goetzel, P.C.; Jeffrey C. Hood; Mark S. Williams

(57) ABSTRACT

System and method for retrieving and displaying patent marking information for resources coupled to or comprised in a computer system. One or more resources, i.e., hardware devices and/or software, may be detected on the computer system. Software resources may be downloaded from an e-commerce server, which may also facilitate ordering and/or purchasing the resources. Patent marking information (PMI) corresponding to each of the resources may be retrieved, including one or more patent numbers for each resource. The respective PMI may be stored on each resource, in a database on the computer system, or in a database on a server coupled to the computer system. The resources may store identification (ID) information identifying the respective resource, where the respective PMI for each resource is retrieved from the patent marking database based on the ID information. The PMI is then displayed, e.g., by a graphical user interface (GUI) on a computer display.

102 Claims, 13 Drawing Sheets

PATENT MARKING SYSTEM

FIELD OF THE INVENTION

The present invention relates to the retrieval and display of patent marking information for detected hardware and/or software in a computer system.

BACKGROUND OF THE INVENTION

A U.S. patent for an invention is the grant of a property right to the inventor(s), issued by the U.S. Patent and Trademark Office. The right conferred by the patent grant is, in the language of the statute and of the grant itself, "the right to exclude others from making, using, offering for sale, or selling" the invention in the United States or "importing" the invention into the United States.

The earliest patent statutes imposed no duty on a patent owner to mark articles. However, the Patent Act of 1842 required the patent owner to mark each product, and failure to do so resulted in a fine of not less than one hundred dollars. The required mark was the date of the patent. The Patent Act of 1861 changed the marking requirement, eliminating the fine for failure to mark and instead establishing a rule much like the current rule, where failure to mark relieves an infringer of liability for conduct prior to the date of actual notice. The Patent Act of 1927 did, however, change the required mark to the word "patent" and the patent number. The marking provision of the Patent Act of 1952 left the marking requirement largely unchanged except to permit the abbreviation "pat." in place of "patent".

A patentee who makes or sells patented articles, or a person who does so for or under the patentee, is thus required to mark the articles with the word "patent" or "pat." and the number of the patent. The penalty for failure to mark is that the patentee may not recover damages from an infringer unless the infringer was duly notified of the infringement and continued to infringe after the notice.

If a patent owner sells a product covered by the patent that has not been marked with the patent number in a way that satisfies the statute, then an infringer starts accruing damage liability only from the date of actual notice to the infringer. The date of actual notice to the infringer may be, for example, the date of filing of a patent infringement complaint, or possibly, of correspondence with the accused infringer.

Thus, a patent owner who sells a patented product but does not mark it may be understood to have led the public to believe that it is not patented. Thus, a patent owner who fails to mark cannot be heard to complain for damages if a member of the public who has not been given actual notice of the patent chooses to copy the product.

Many computer-based systems, such as measurement, control, analysis, machine vision, and instrumentation systems, among others, may include a variety of resources, i.e., components or sub-systems, to perform various tasks. These resources may include hardware devices, software programs, and/or hardware configuration programs. For example, a measurement system may include one or more sensors coupled to the computer, one or more expansion cards comprised in the computer, such as data acquisition (DAQ) cards, and image acquisition (IMAQ) cards, etc., and various software programs, including application programs and drivers, for processing and/or analyzing measurement data. The measurement system may also include a programmable hardware element, e.g., a field programmable gate array (FPGA), configured with a hardware configuration program.

Each of these resources may include patented technologies, i.e., features which are covered by one or more patents. Generally, for products such as the resources described above, patent information is marked either on the product itself, e.g., on a computer card or computer disc (e.g., a CD-ROM), or on the packaging of the product. In many cases, the patent marking information may not be easily visible, and in some cases, may not be visible at all. For example, if a computer card is installed in an expansion slot inside the chassis of the computer system, then the patent mark(s) may be effectively hidden from view once the card is installed. Similarly, once a software program has been installed on a computer system, any patent marking on the packaging or on the disc may not be available for viewing by a user of the computer system. Similarly, for an FPGA configured with a hardware configuration program, patent marking information may not be readily viewed.

Furthermore, many computer systems may be maintained by a system administrator. Thus the administrator may configure hardware and software for various users' computer system. In this case, a user may not be aware of some of the resources coupled to or installed on the computer system, and thus, may not be able to ascertain patent marking information for the resources.

For software programs that include patented technology, another patent marking method is to display the patent marking information in the software. For example, the patent marking information may appear in a menu item of the software program (e.g., the About Box) or during installation and/or start up of the program. One problem with this method is that there may be no standardized location for patent marking information among various software programs. In addition, in many instances, software programs may be downloaded and installed on the user's machine with little or no notice to the user, or may be installed by an administrator without the user's knowledge. Thus the user may not know to look for patent marking information for this software. Further, many software programs execute invisibly to the user, e.g., with no graphical user interface, and hence, patent marking information cannot readily be displayed to the user. For hardware devices, patent marking information may be included in the corresponding software driver, if one is available. However, in most instances the software driver executes invisibly to the user. For hardware configuration programs, patent marking information may be difficult to display.

Thus, improved systems and methods are desired for retrieving and displaying patent marking information for software and hardware resources coupled to or comprised in a computer system.

SUMMARY OF THE INVENTION

The present invention comprises various embodiments of a system and method for retrieving and displaying patent marking information for resources coupled to or comprised in a computer system. An exemplary system for implementing various embodiments of the present invention includes a host computer system. The computer system preferably has at least one processor that executes instructions from a memory medium. One or more resources may be coupled to or comprised in the host computer. As used herein, the term "resource" is intended to include any device, software program, and/or hardware configuration program coupled to or comprised in the computer system.

The patent marking information for each resource, i.e., for each device or program, preferably includes one or more patent numbers for the resource. For example, if a resource comprises technology which is patented in three different patents, then the patent marking information may include the patent numbers of the three patents. In one embodiment, the patent marking information may include status information indicating that a patent is pending, i.e., has not been issued yet. For example, the patent marking information may include the phrase "pat. pending" or the equivalent.

The computer system may include a memory medium(s) on which one or more computer programs according to various embodiments of the present invention may be stored. For example, the memory medium may store a patent marking software program which is executable to retrieve and/or present patent marking information as described herein. The patent marking software program may be part of the computer operating system or a configuration program.

In one embodiment, the host computer system may detect hardware and/or software coupled to or comprised in the computer system, retrieve corresponding patent marking information from the detected resource, and display the patent marking information to a user of the system. In another embodiment, the computer system may store patent marking information, for example, in a database or library, which may be accessed or retrieved based on resource identification (ID) information, such as device or software ID numbers. The host computer system may detect hardware and/or software coupled to or comprised in the host computer system, determine corresponding IDs of the resources, retrieve corresponding patent marking information from the database based on these IDs, and display the information to the user. Thus, embodiments of the present invention may be implemented by software programs comprised in the host computer.

Another exemplary system for implementing various embodiments of the present invention comprises a distributed system including a first or host computer system that may be coupled to a server computer system, e.g., over a network or computer bus. In one embodiment, the server may store the patent marking information, for example, in a database or library which may be accessed or retrieved by the host computer system. The patent marking database may be periodically updated as new products are released and/or new patents are issued. The host computer system may detect hardware and/or software coupled to or comprised in the computer system, and may request or retrieve corresponding patent marking information from the server, as described in more detail below. Alternatively, the host computer system may access a web site of the server for display of the relevant patent marking information.

A method implementing an embodiment of the invention may operate as follows. First, one or more resources, i.e., hardware and/or software, may be detected on the computer system, e.g., at boot time. Resources may also be detected when they are installed. The detection of the resources may be performed by various types of "plug and play" software and/or patent marking software executing in the computer system.

In response to the detection and/or installation of the resources, patent marking information corresponding to each of the resources may be retrieved. In one embodiment, each of the resources, i.e., devices and/or programs, may store corresponding patent marking information. Each of the resources may store patent marking information in a predefined format and/or location to facilitate retrieval. In this instance, the patent marking software and/or the "plug and play" software may retrieve the respective patent marking information from each resource.

In another embodiment, the patent marking information for each resource may be stored or included in the computer system or on a separate patent marking server, for example, in a patent marking database comprised in the memory medium of the computer or server. In this embodiment, the patent marking software and/or the "plug and play" software may execute to retrieve the respective patent marking information for each resource from the patent marking database, based on the detected resources.

In one embodiment, each resource may each store identification (ID) information which identifies the respective resource. In this embodiment, the ID information for each resource may be retrieved after, or as part of, the detection mentioned above. The ID information may be used to index into the patent marking database for retrieval of the corresponding patent marking information, where the patent marking database may be stored on the host computer system or a separate server. Various combinations of the embodiments described above are also contemplated.

After the retrieval of the patent marking information, the patent marking information may be displayed. As one example, the patent marking software may execute to display the retrieved patent marking information on a computer display, such as a computer monitor. In one embodiment, the method displays a name or icon of each resource, and the patent marking information for a respective resource is displayed proximate to the name or icon of the respective resource. The ID information for each resource may also be displayed. In one embodiment, the patent marking information may be printed out on a printer.

In one embodiment, the patent marking software may be executable to present a (Graphical User Interface) GUI on the computer display which displays the patent marking information. For example, the patent marking information may be displayed in a pop-up dialog box, or the patent marking software may access and display a web site where the patent marking information is displayed. The pop-up dialog box or web site may be operable to close upon receiving user input, e.g., when the user clicks on an "accept" or "go-away" button. The user input terminating display of the patent marking information may be used to indicate that the user has read and understood the patent marking information. As noted above, the GUI may include one or more icons corresponding to the one or more detected resources, and the patent marking information may be displayed proximate to an icon of the respective resource containing the patented technology.

The patent marking information for a detected resource may be displayed for a specified period of time. For example, the patent marking information, or a pop-up dialog box or window which contains the patent marking information, may be displayed for a brief period of time, e.g., 5 seconds, 10 seconds, 30 seconds, 60 seconds, or any other finite period of time, after which the patent marking information may disappear or the dialog box or window may close. Alternatively, the patent marking information for a detected resource may be displayed when a user moves a cursor over an icon corresponding to the resource. The patent marking information may be displayed for as long as the cursor is positioned over the icon or for a preset amount of time.

In one embodiment, the patent marking information may be displayed in a periodic manner. For example, the patent marking information may be displayed every tenth time the resource is detected (or every tenth time the computer is booted). For another example, the patent marking information may be displayed based upon a determined probability (e.g., a 10% chance of being displayed each detection).

In another embodiment, the patent marking information may be displayed on the computer display when the detection occurs for the first time. In other words, when the computer system, i.e., the "plug and play" software or patent marking software, detects a resource for the very first time, the patent marking information may be displayed, but upon subsequent detections of the same resource the patent marking information for that resource may not be displayed.

In one embodiment, the detecting, the retrieving, and the displaying described above may be performed upon one or more of 1) a change in the one or more resources coupled to or comprised in the computer system; and 2) a change of user of the computer system. For example, the detecting, retrieving, and displaying may be performed whenever the system (i.e., the "plug and play" software or the patent marking software) determines that a new or different resource has been added, i.e., installed, on the computer system, and/or on a device coupled to the computer system. In one embodiment, a change of user may include one or both of 1) a user logging onto the computer system for the first time; and 2) a first user logging off of the computer system followed by a second user logging onto the computer system.

In one embodiment, the patent marking software may be part of, or integrated with, a configuration software program which may display icons or menus for detected hardware and software components. One example of a configuration software program is Measurement and Automation Explorer (MAX) from National Instruments Corporation. The MAX software program may display icons or text corresponding to detected measurement hardware and software products and may display corresponding patent marking information, as described herein. In another embodiment, the patent marking software may be part of an operating system of the computer system. The operating system may operate to detect hardware and/or software components and display corresponding patent marking information, as described herein.

In one embodiment, as noted above, the patent marking database may be updated periodically. For example, the computer system which stores the patent marking database (i.e., the host computer or the server computer) may access another server computer system periodically to request and download updated patent marking information (e.g., from various manufacturers or the Patent and Trademark Office), such as patent marking information for new devices and/or software products. In one embodiment, the patent marking database may be updated when resources are detected whose patent marking information is not stored in the patent marking database.

In a second embodiment, an e-commerce server operable to host an e-commerce system may include a patent marking database. The server may host an e-commerce website and one or more software programs for conducting business transactions, information processing, or any other e-commerce operations, whereby a customer may order or purchase a product, i.e., software product or hardware device. In one embodiment, an order and/or purchase of one or more programs may be made followed by downloading the one or more purchased programs. For example, the computer system may access the e-commerce server and provide user input specifying the desired programs. In one embodiment, a GUI may be presented to the user to facilitate the ordering/purchasing transaction. For example, the GUI may receive payment information, such as a credit card number or billing account, whereby payment for the one or more programs may be made. In other embodiments, the order/purchase may be made via other means, such as by telephone, email, mail, etc.

When the product is a software program or hardware configuration program, the product may be delivered to the customer by downloading the program over the network, for example, to the host computer system. In one embodiment, patent marking software executing on the server may retrieve and display patent marking information either before or after downloading the programs. In another embodiment, patent marking information corresponding to the product may be downloaded along with the product. In another embodiment, after the host computer system has downloaded the product from the e-commerce system, the host computer system may request the patent marking information from the e-commerce system or from another server, i.e., a patent marking information server, which may then transmit or download the patent marking information to the host computer system as described above.

Thus, patent marking information corresponding to the downloaded program(s) may be retrieved and displayed as described above either by the server or by the host computer system, and either before or after the programs are downloaded.

Thus, as described above, in one embodiment, each program may store patent marking information. Thus, before or after each program is downloaded and stored, patent marking software may execute (on the server or host computer system) to retrieve and display the patent marking information from each respective program. Alternatively, as described above, each program may store identification (ID) information which identifies the respective program. In this embodiment, the patent marking software may retrieve the respective patent marking information for each program from the patent marking database based on the ID information comprised in each program, as described above. As noted above, the patent marking database may be comprised in the host computer system, or in a separate patent marking information server, which may be the e-commerce server. As also mentioned above, in various embodiments the patent marking database may be updated in the various ways described above, among others.

After the retrieval of the patent marking information, the patent marking information for the downloaded programs may be displayed, as described in detail above. As also mentioned above, in one embodiment, the patent marking information may be displayed proximate to icons or other ID information for each program.

When the user orders hardware products from the e-commerce server that are to be shipped to the user, the server may provide patent marking information to the host computer system for the ordered hardware. Alternatively, the software drivers for the ordered hardware, which may be provided by the server or shipped with the hardware, may include the patent marking information and/or ID information for the ordered hardware.

In one embodiment, the software products may include one or more of: an application program, a driver program, and a hardware configuration program. For example, where the software products comprise an application program, the application program may be any type of application program, including, for example, a business application, entertainment application, scientific application, medical application, or financial application, measurement application, control application, analysis application, machine vision application, or motion application, among others. In this instance, in one embodiment the hardware configuration program includes patent marking information (or an ID for retrieving patent marking information) that can be retrieved and displayed. In another embodiment, patent marking information for inventions comprised in the hardware configuration program may be separately provided to the host computer system and registered with host patent marking system, or with host configuration software or the host operating system.

In one embodiment one of the programs may comprise a hardware configuration program which may be operable to configure a programmable hardware element or reconfigurable logic, such as a field programmable gate array (FPGA). For example, a hardware configuration program may comprise a bit file generated from a netlist or hardware description, which may configure the programmable hardware element to function as any of a variety of devices, e.g., measurement, control, signal processing, automation, machine vision, and communication devices, among others. In one embodiment, the hardware configuration program includes patent marking information (or an ID for retrieving patent marking information that can be retrieved and displayed. In another embodiment, patent marking information for technologies/inventions comprised in the hardware configuration program may be separately provided to the host computer system and registered with host patent marking software, with host configuration software, or the host operating system.

Thus, various embodiments of the method described above may provide for the detection of hardware and/or software resources coupled to or comprised in a computer system, the retrieval of patent marking information corresponding respectively to the resources, and the display of the patent marking information on a computer display.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The present invention comprises various embodiments of a system and method for retrieving and displaying patent marking information for resources coupled to or comprised in a computer system.

Figure 1A:
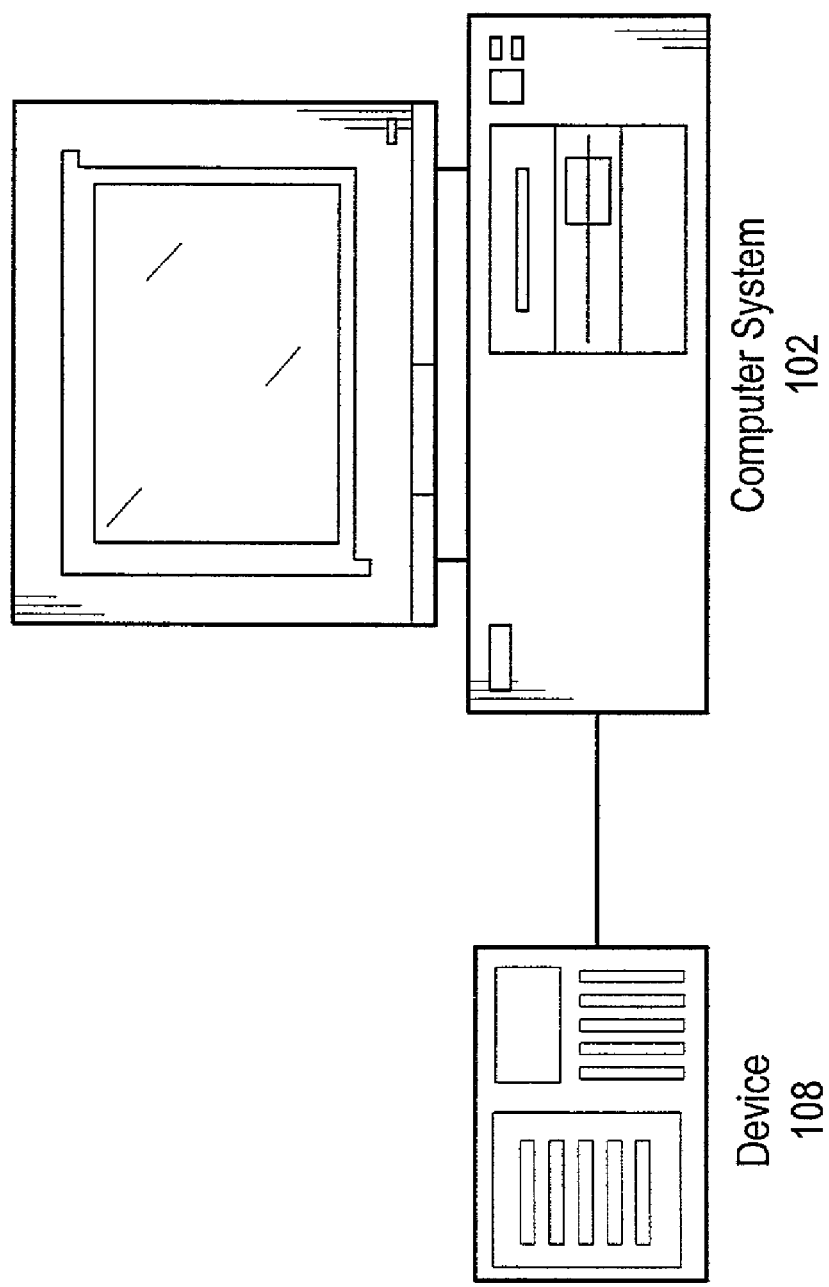
FIGS. 1A-1C illustrate three embodiments of a computer system for displaying patent marking information.

FIG. 1A—Computer System

FIG. 1A illustrates an exemplary computer system which may be suitable to implement various embodiments of the present invention. The host computer system 102 may be any of various types, as desired, including a personal computer system, mainframe computer system, workstation, network appliance, Internet appliance, etc. In general, the term "computer system" can be broadly defined to encompass any device having at least one processor that executes instructions from a memory medium.

In one embodiment, one or more resources may be coupled to or comprised in the host computer 102. As used herein, the term "resource" is intended to include any devices (defined below) and/or programs coupled to or comprised in the computer system. The term "resource" may also refer to programs comprised in a device that is coupled to or comprised in the computer system. As FIG. 1A shows, in this embodiment, at least one device 108 may be coupled to the host computer system 102. In one embodiment, the device 108 may also include one or more programs (resources) installed therein. Additionally, one or more other software programs (resources), e.g., drivers and/or applications, may be installed on the host computer system 102.

As used herein, the term "device" is intended to include any of various types of devices that are operable to be coupled to the host computer, including computer systems, network devices, personal digital assistants (PDAs), television systems, measurement devices, instruments, industrial automation devices, process control devices, smart data acquisition devices, smart sensors (including smart cameras), smart actuators, video devices (e.g., digital cameras, digital video cameras), audio devices, computer peripherals, telephones, appliances, or other processor-based or programmable hardware-based devices, as well as various computer expansion cards. Exemplary measurement and automation devices include any of the devices shown in FIGS. 2A-2C, among others. Exemplary network devices include network interface cards, routers, bridges, switches, hubs, etc.

As used herein, the term "program" includes software programs executable by a CPU, and hardware configuration programs for configuring a programmable hardware element.

As used herein, the term "software program" includes application software programs, software drivers, and other types of software programs. A software driver may operate to control another software program or a hardware device. A software program may be any type of code, script and/or data that may be stored in a memory medium and executed by a processor. Exemplary software programs include programs written in text-based programming languages, such as C, C++, Pascal, Fortran, Cobol, Java, etc.; programs written in assembly language; programs written in graphical programming languages; programs that have been compiled to machine language; scripts; and other types of executable software.

The term "hardware configuration program" refers to a program useable for configuring a programmable hardware element or reconfigurable logic. Exemplary hardware configuration programs include netlists or bit files for elements such as FPGAs and other reconfigurable hardware.

As used herein, the term "software driver" includes a program that interfaces to or controls a device, or which interfaces to or controls another software program. As used herein, the term "application" includes one or more programs that perform a function. Thus, an application may comprise a plurality of programs which operate together to perform a function or accomplish a certain result. The plurality of programs may operate together in a distributed system, wherein various programs may be deployed to various devices in the distributed system for distributed execution. An application may thus comprise a plurality of programs distributed among a plurality of devices for distributed execution. An application may also include other data structures such as configuration programs for configuring hardware devices, help files, supporting documentation, etc.

The computer system 102 may include a memory medium on which one or more computer programs or software components according to various embodiments of the present invention may be stored. For example, the memory medium may store one or more patent marking software programs which are executable to retrieve and/or present patent marking information as described herein. The memory medium may also store operating system software, a configuration software program, and/or other software for operation of the computer system.

The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer, e.g., host computer system 102, in which the programs are executed, or may be located in a second different computer, e.g., a server computer 103, which connects to the first computer over a network, such as the Internet. In the latter instance, the second computer may provide program instructions to the first computer for execution.

Figure 1B:
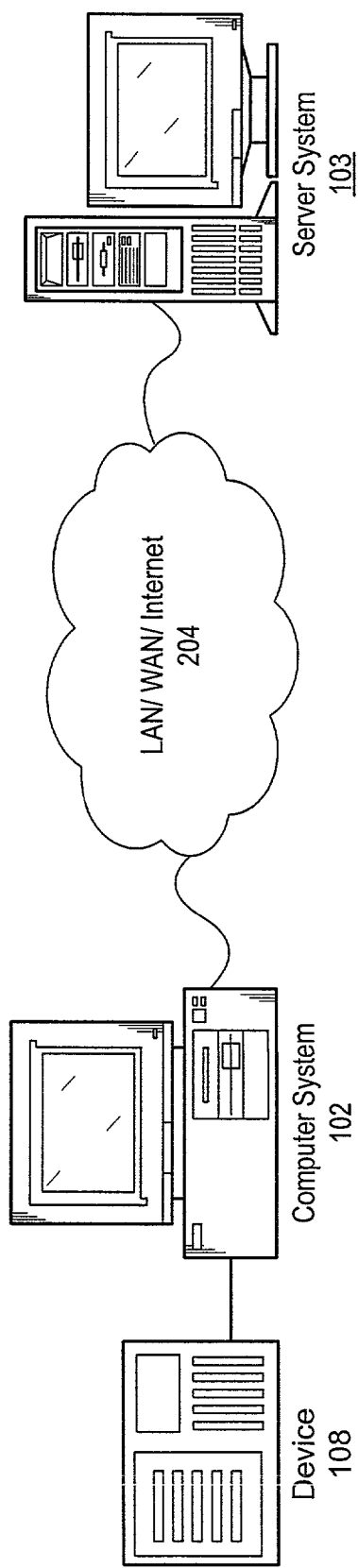
Figure 1C:
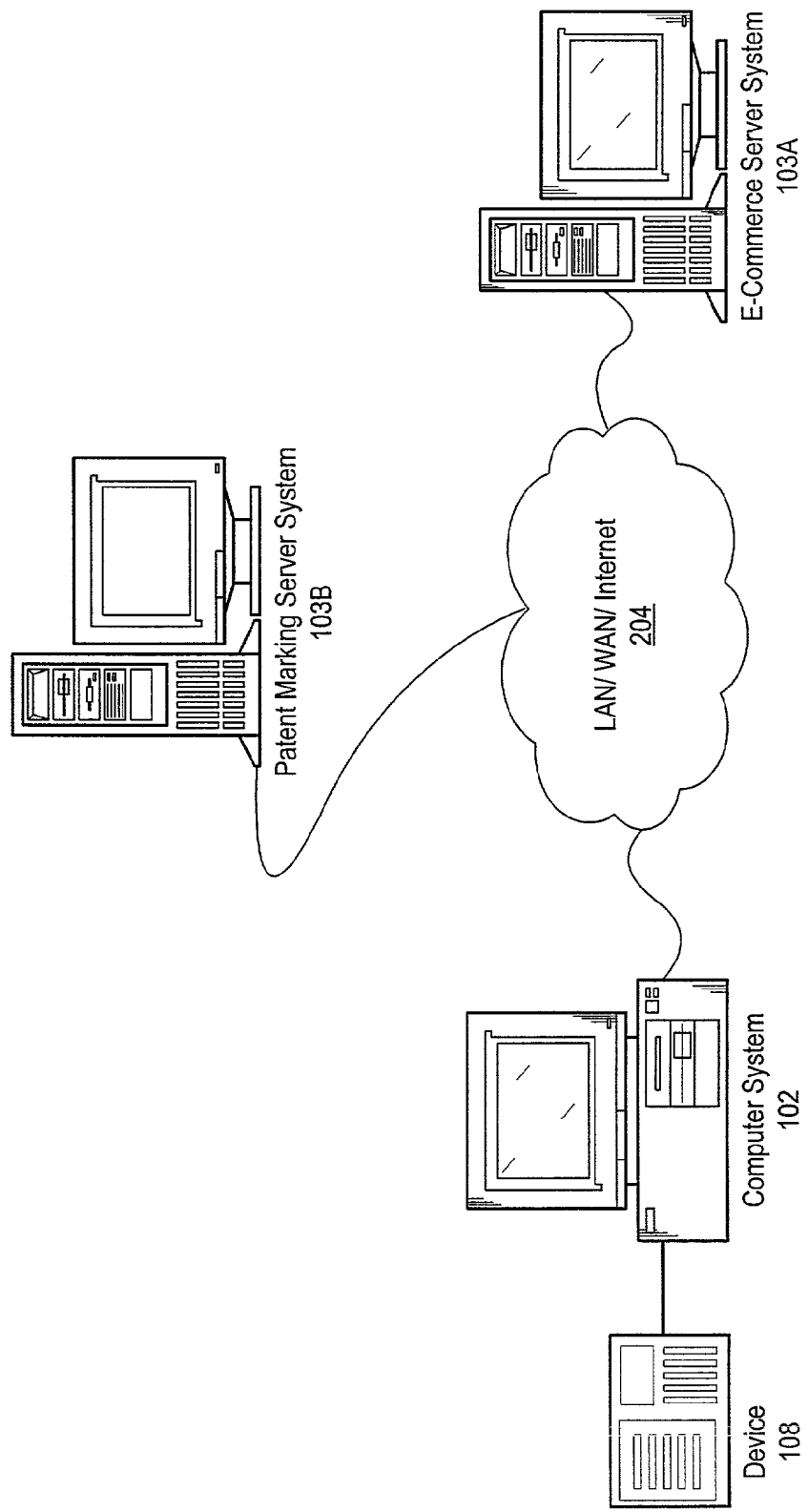

Thus, the patent marking software programs of the present invention may be stored in a memory medium of the respective computer 102, or in a memory medium of another computer, e.g., a server computer 103 as shown in FIGS. 1B and 1C, and executed by the CPU of either system. The CPU executing code and data from the memory medium thus may comprise a means for detecting one or more devices and/or programs coupled to or comprised in the computer system 102 and retrieving and displaying corresponding patent marking information, according to the descriptions below.

It is noted that in this embodiment, the present invention may be implemented by software programs comprised only in the host computer 102, i.e., without a second or server computer system 103. In other words, the host system 102 may be a stand-alone system, i.e., may operate in stand-alone mode. It is noted, however, that the host computer system 102 may also be operable to connect to a second computer system 103, e.g., a server, as needed, to receive updates to the stored patent marking database/library described above. Also, the server 103 may execute the patent marking software program to detect resources in the host computer 102 and display patent marking information using the methods described herein. The server 103 and host computer system may also operate together. Further embodiments are described below with reference to FIGS. 1B and 1C, wherein the invention is implemented in a distributed computer system, i.e., where the host computer system 102 is coupled to one or more server computer systems 103 which may provide at least a portion of the functionality of the present invention.

FIG. 1B—Computer Network

FIG. 1B illustrates an exemplary distributed system including the host computer system 102, and a second computer system 103, e.g., a server computer 103, which may be operable to couple to the host computer system 102. The computer system 102 may be coupled to the second computer system 103 through a network 204 (or a computer bus). The computer systems 102 and 103 may each be any of various types as desired, as described above. Also, the network 204 can also be any of various types, including a LAN (local area network), WAN (wide area network), the Internet, or an Intranet, among others. The transmission medium coupling the systems may include any wired or wireless media, as are well known in the art. Thus, in one embodiment, the host computer 102 and the server computer 103 may comprise a distributed system.

As used herein, the term "distributed system" is intended to include a system comprising two or more interconnected or coupled devices, i.e., two or more devices that are coupled together in some fashion. The two or more devices may be coupled together via wired or wireless means. Wired means may include a network, such as a local area network (LAN) and/or a wide area network (WAN), such as the Internet, a computer bus, a serial or parallel bus, or other wired communication methods. Example local area networks include Ethernet networks, Token Ring networks, and various industrial communication networks such as fieldbus, DeviceNet, and CAN (Controller Area Network) networks. Example parallel buses include the PCI bus, PXI bus, GPIB, and VXI bus, among others. Example serial buses include USB (Universal Serial Bus), IEEE 1394, RS-242, and RS-485, among others. Wireless means may include wireless protocols such as IEEE 802.11 (wireless Ethernet), Bluetooth, and other types of wireless communication.

As mentioned above, one or more resources may also be coupled to or comprised in the host computer 102, including hardware devices, and/or programs.

In one embodiment, the server 103 may store patent marking information which may be accessed or retrieved by the host computer system 102. Thus, the server 103 may comprise a patent marking information server which may store patent marking information, for example, in a database or library. The host computer system 102 may detect hardware and/or software coupled to or comprised in the computer system 102, and may request or retrieve corresponding patent marking information from the server 103, as described in more detail below.

In one embodiment, the server 103 may comprise an e-commerce server 103A which may be operable to host an e-commerce system. For example, the server 103A may host an e-commerce website and one or more software programs for conducting business transactions, information processing, or any other e-commerce operations. As one example, the e-commerce server 103A may host an e-commerce system whereby a customer may order or purchase a software product, i.e., a program, or a hardware device. When the product is a program, the product may be delivered to the customer by downloading the software over the network, for example, to the host computer system 102. In one embodiment, patent marking information corresponding to the software product or program may be downloaded along with the product. In another embodiment, after the host computer system 102 has downloaded the product from the e-commerce system 103A, the host computer system 102 may request the patent marking information from the e-commerce system 103A, or from a separate patent marking server, which may then transmit or download the patent marking information to the host computer system 102. Further details of these and other embodiments are presented below.

FIG. 1C—A Distributed Computer System

FIG. 1C illustrates another embodiment of a computer system which is suitable for implementing various embodiments of the present invention. As FIG. 1C shows, the host computer system 102 may be coupled to an e-commerce server system 103A over the network 204, as described above. In this embodiment, the host computer system 102 may also be coupled to a patent marking information server 103B over the network 204, as shown. As described above, the patent marking information server 103B may store patent marking information, for example, in a database or library, which may be retrievable by the host computer system 102.

In one embodiment, a user of the host computer system 102 may purchase a product by performing a transaction with the e-commerce server 103A. In other words, the user (i.e., the host computer 102) may connect to the e-commerce server 103A over the network 204, and order the product, optionally providing payment information to the server 103A. If the product is a software product, e.g., a program, then the user (via the host computer system 102) may also download the software product to the host computer system 102. Alternatively, the software product may remain on the server 103A and may be available for use by the host computer system 102.

In one embodiment, the host computer 102 may be operable to determine identification (ID) information for the product, and may be further operable to access the patent marking information server 103B, using the ID information of the product to request and retrieve patent marking information corresponding to the product. Alternatively, in response to the purchase, the e-commerce server 103A may direct the patent marking information server 103B to provide the corresponding patent marking information to the host computer system 102. The host computer system 102 may then be operable to display the patent marking information. Further details of this and other embodiments are presented below.

Figure 2A:
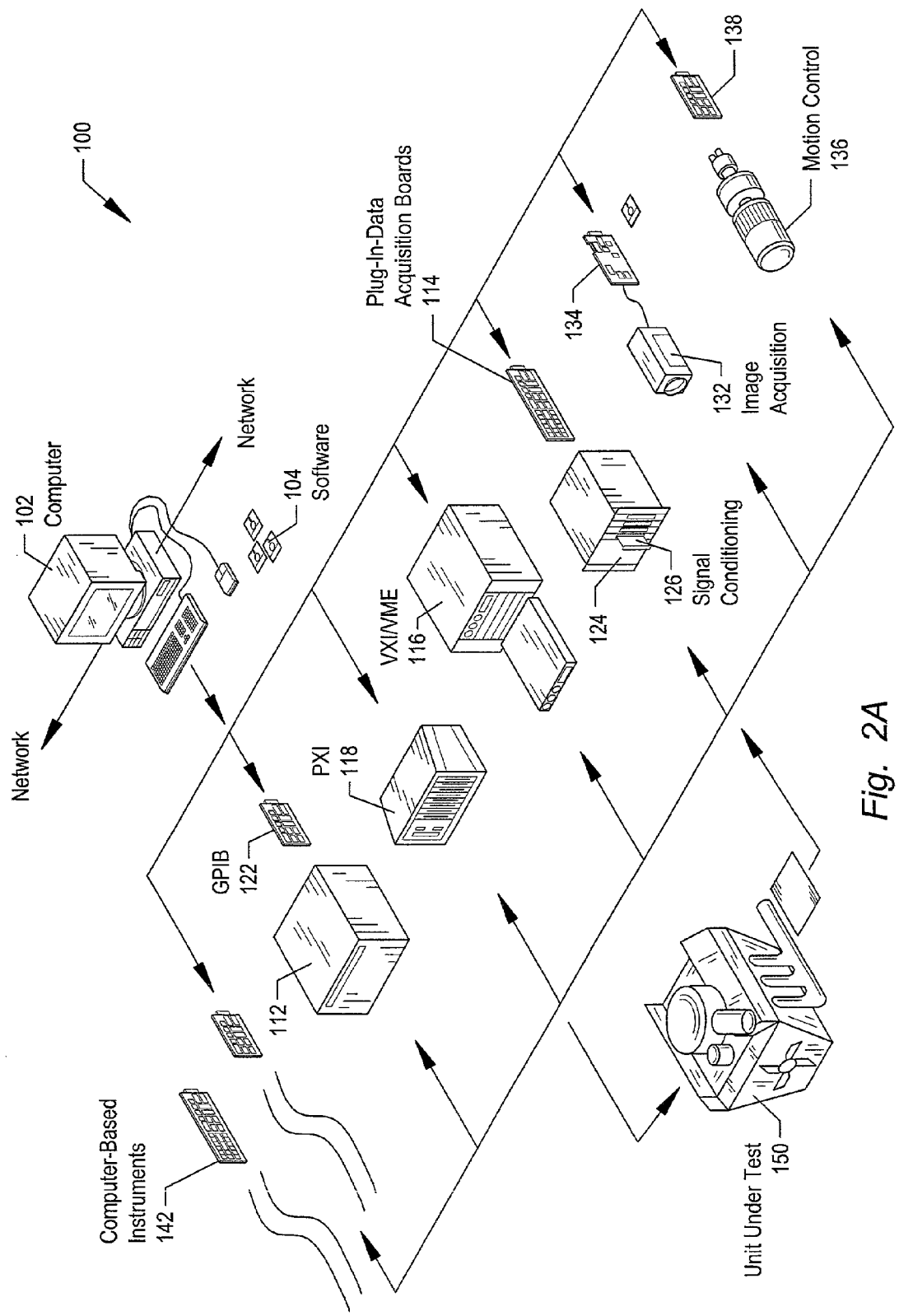
FIGS. 2A-2C illustrate various embodiments of systems for displaying patent marking information.
Figure 2B:
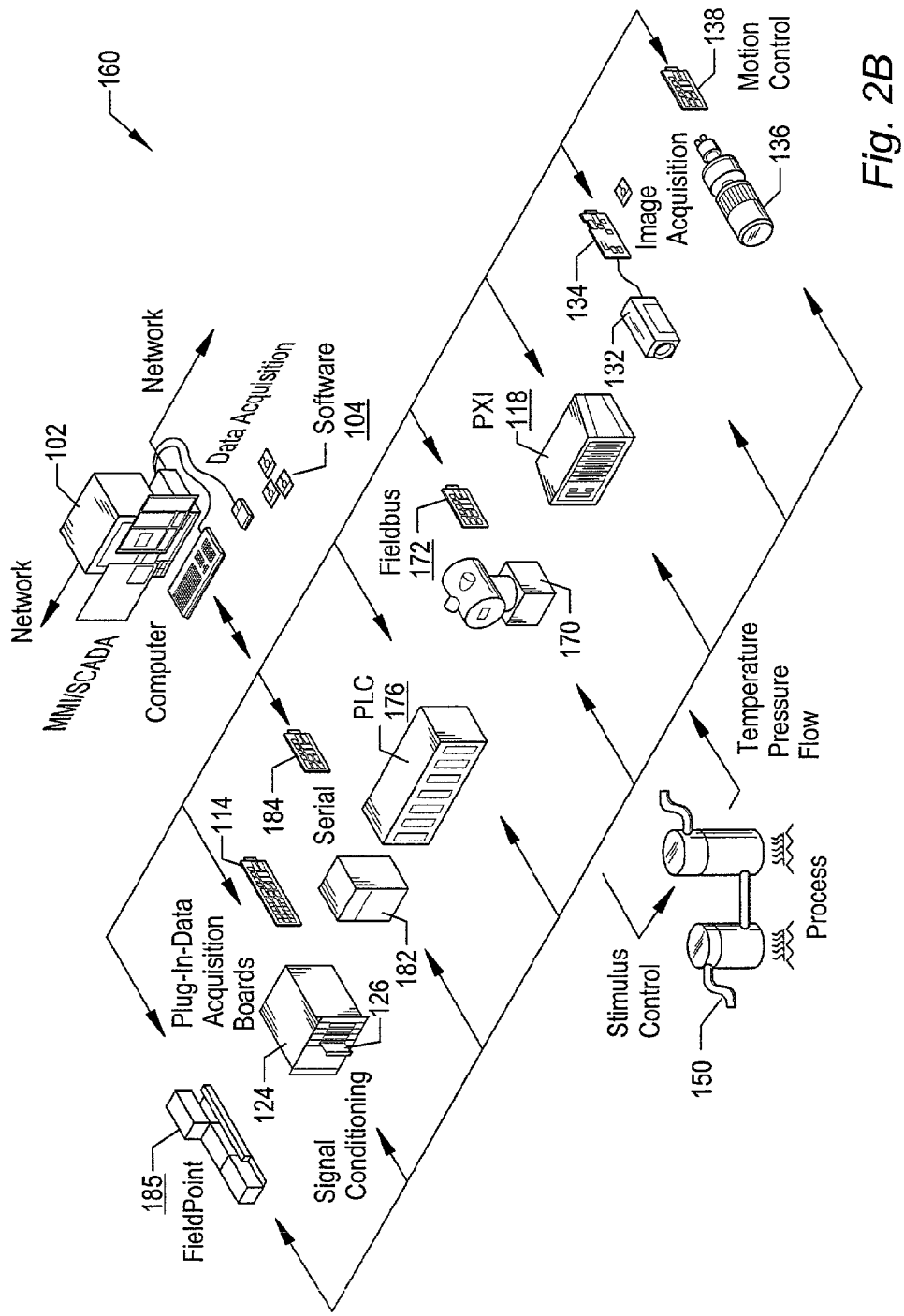

FIGS. 2A and 2B—Instrumentation and Industrial Automation Systems

The following describes embodiments of the present invention related to systems which perform test and/or measurement functions and/or which control and/or model instrumentation or industrial automation hardware. However, it is noted that the present invention can be used for a plethora of applications and is not limited to instrumentation or industrial automation applications. In other words, the following description is exemplary only, and the present invention may be used in any of various types of systems. Thus, the system and method of the present invention are operable to be used in any of various types of applications, including distributed systems which include other types of devices such as multimedia devices, video devices, audio devices, telephony devices, Internet devices, network devices, display devices, communication devices, etc.

FIG. 2A illustrates an exemplary instrumentation system 100 which may implement embodiments of the invention. The system 100 comprises a host computer 102 which connects to one or more measurement devices or instruments. The host computer 102 may comprise a CPU, a display, such as a display screen or monitor, memory, and one or more input devices such as a mouse or keyboard as shown. Each of (or at least a subset of) the measurement devices may include a processor and/or a programmable hardware element, and may be capable of receiving and executing programs in a distributed application. The computer 102 may couple to one or more other computers, such as computer 103, over a network, wherein the one or more other computers may form part of the distributed system. The computer 102 may operate with the one or more measurement devices to analyze, measure or control a unit under test (UUT) or process 150 or to perform simulation of a system, such as hardware-in-the-loop simulation.

The one or more measurement devices or instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices.

The GPIB instrument 112 may be coupled to the computer 102 via the GPIB interface card 122 provided by the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and may interface through signal conditioning circuitry 124 to the UUT. The signal conditioning circuitry 124 may comprise an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or Micro-Channel bus slot provided by the computer 102. However, these cards 122, 134, 138 and 114 are shown external to computer 102 for illustrative purposes. These devices may also be connected to the computer 102 through a serial bus or through other means.

The VXI chassis or instrument 116 may be coupled to the computer 102 via a VXI bus, MXI bus, or other serial or parallel bus provided by the computer 102. The computer 102 may include VXI interface logic, such as a VXI, MXI or GPIB interface card (not shown), which interfaces to the VXI chassis 116. The PXI chassis or instrument may be coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The measurement devices or instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 102 which connects to one or more devices or instruments, as described above. Each of the devices shown in FIG. 2B may include a processor and/or a programmable hardware element, and may be capable of receiving and executing programs in a distributed application. As also described above, the computer 102 may couple to one or more other computers over a network, forming a distributed system. The computer 102 may operate with the one or more devices to measure or control a process or device 150. The distributed system may perform an automation function, such as MMI (Man Machine Interface), SCADA (Supervisory Control and Data Acquisition), portable or distributed data acquisition, process control, advanced analysis, or other control functionality.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system 185, such as the Fieldpoint system available from National Instruments, among other types of devices.

The DAQ card 114, the PXI chassis 118, the video device 132, and the image acquisition card 134 may be connected to the computer 102 as described above. The serial instrument 182 may be coupled to the computer 102 through a serial interface card 184, or through a serial port, such as an RS-232 port, provided by the computer 102. The PLC 176 may couple to the computer 102 through a serial port, Ethernet port, or a proprietary interface. The fieldbus interface card 172 may be comprised in the computer 102 and may interface through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices may be coupled to the device or process 150.

As used herein, the term "instrument" is intended to include any of the devices that are adapted to be connected to a computer system as shown in FIGS. 2A and 2B, traditional "stand-alone" instruments, as well as other types of measurement and control devices. The term "measurement function" may include any type of data acquisition, measurement or control function, such as that implemented by the instruments shown in FIGS. 2A and 2B. For example, the term "measurement function" includes acquisition and/or processing of an image.

In the embodiments of FIGS. 2A and 2B above, one or more of the various instruments may couple to the computer 102 over a network, such as the Internet. In one embodiment, the user may install or configure one or more instruments or devices from a plurality of possible devices. In one embodiment, after the user installs and/or couples a device to the host computer system 102, the host computer system 102 may detect one or more of the instruments or devices and may retrieve corresponding patent marking information for display to the user. A configuration software program may execute to detect and/or receive information regarding installed devices(s) and retrieve and display the patent marking information according to the methods described herein. Other embodiments of the invention are described below.

Software programs which perform data acquisition, analysis and/or presentation, e.g., for measurement, instrumentation control, industrial automation, or simulation, such as in the applications shown in FIGS. 2A and 2B, may be referred to as virtual instruments. In one embodiment, the user may select one or more applications or virtual instruments from a plurality of possible applications for retrieval of corresponding patent marking information according to the methods described herein. In another embodiment, the host computer system 102 may detect one or more of the applications or virtual instruments and may retrieve corresponding patent marking information for display to the user.

Although in the preferred embodiment the methods described herein are involved with measurement applications, including data acquisition/generation, analysis, and/or display, and for controlling or modeling instrumentation or industrial automation hardware, as noted above the present invention can be used for a plethora of applications and is not limited to measurement, instrumentation or industrial automation applications.

In other words, FIGS. 2A and 2B are exemplary only, and the present invention may be used in any of various types of systems. Thus, the system and method is operable for detecting, retrieving, and/or displaying patent marking information for any of various types of applications.

Figure 2C:
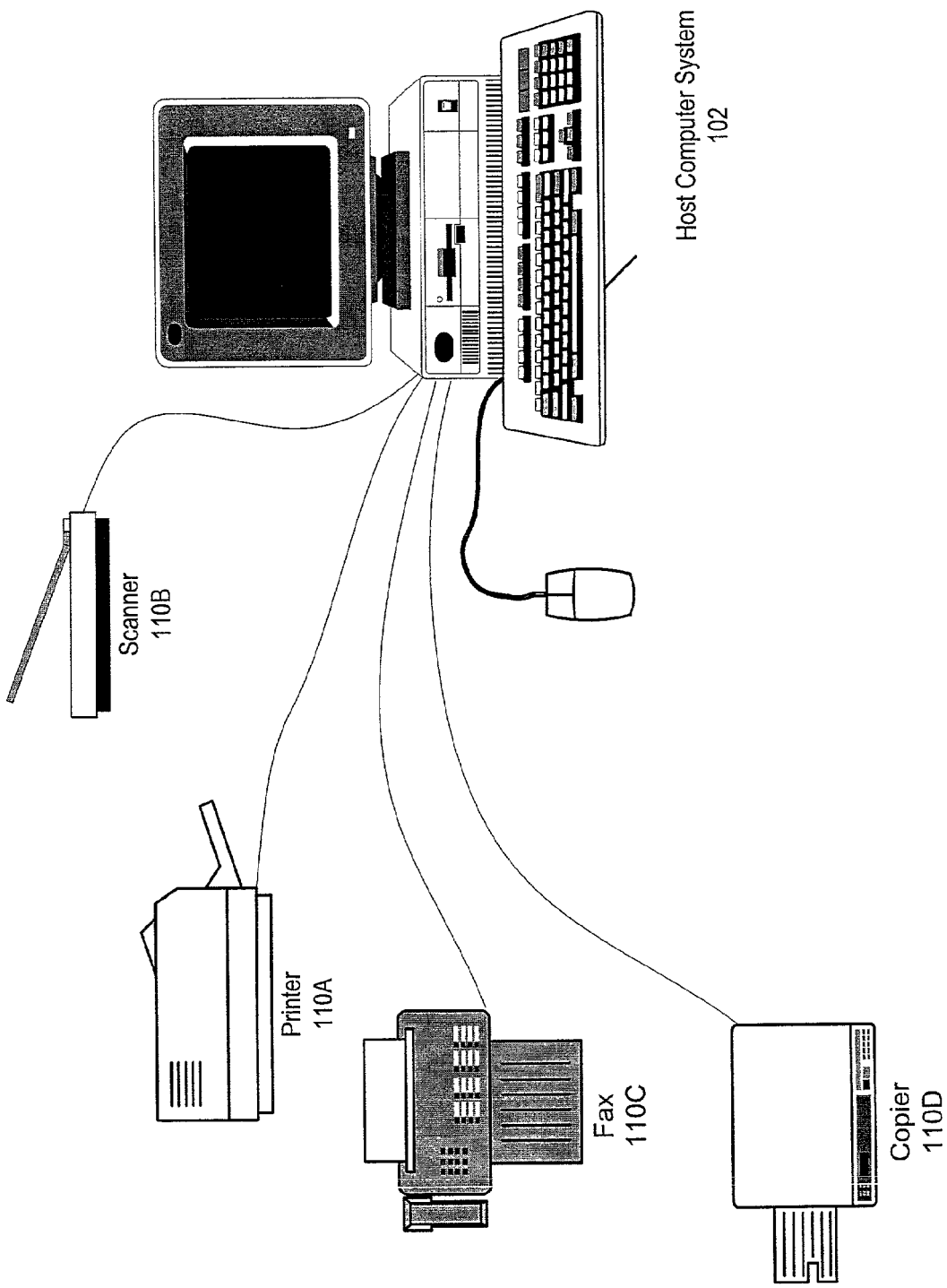

FIG. 2C—A System for Displaying Patent Marking Information

FIG. 2C illustrates another embodiment of a computer-based system for displaying patent marking information. As FIG. 2C shows, the host computer system 102 may be coupled to one or more devices 110, such as, for example, a printer 110A, a scanner 110B, a fax machine 110C, and a copier 110D. One or more of the devices may be coupled to an interface card comprised in the computer system 102. Various device/bus types contemplated include PCI, PXI, IEEE 1194 (FireWire), and USB, among others. Thus the embodiment shown in FIG. 2C represents a typical business office workstation. It is noted that the devices shown are meant to be illustrative only, and are not intended to limit the types of devices suitable for use in or by the invention.

The computer system 102 as shown is a standard PC (Personal Computer), comprising a processor and memory, as well as a display (monitor), keyboard, and mouse. However, as noted above, the computer system may take any of various forms, such as a personal computer, or any type of device which includes a processor that executes instructions from a memory medium, or which includes programmable logic that has been configured to perform the methods described in FIGS. 4A-4C and 5A-5C.

It should be noted that in one embodiment, the computer system 102 may also be coupled to a network, such as the Internet, and may be operable to send and receive data to and from other systems on the network, as described above with reference to FIGS. 1A-2B. For example, the computer system 102 may be coupled to a server 103, such as a patent marking server 103B and/or an e-commerce server 103A, as described above.

In one embodiment, the computer system 102 may be operable to detect one or more resources coupled to or comprised in the computer system 102, such as, for example, through "plug and play" software, where each resource is operable to provide identification information to the computer system 102. The computer system 102 may then be operable to use the identification information to retrieve patent marking information for each resource and display the patent marking information. As mentioned above, in one embodiment, the patent marking information, may be stored in the computer system 102, e.g., in a database or library, for retrieval as described.

Figure 3A:
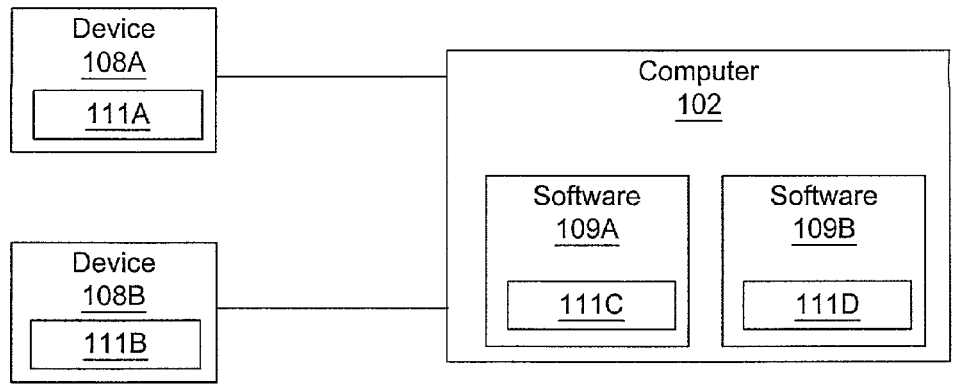
FIGS. 3A-3C are block diagrams of various embodiments of the systems of FIGS. 2A-2C.
Figure 3B:
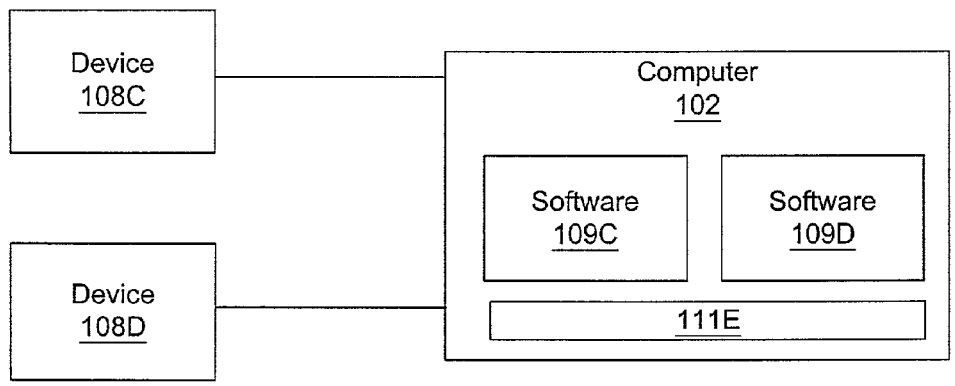
Figure 3C:
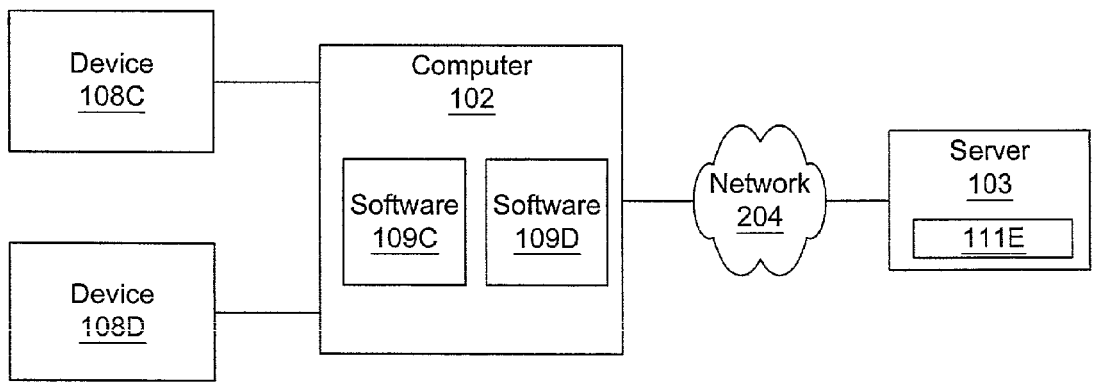

FIGS. 3A-3C—Block Diagrams of Patent Marking System

FIGS. 3A-3C are block diagrams of various exemplary embodiments of a patent marking system. In each of the embodiments shown, a plurality of resources, e.g., hardware and/or software, are coupled to or comprised in the computer system 102. It is noted that these embodiments are meant to be illustrative, and are not intended to limit the system to any particular architecture or design.

FIG. 3A is a block diagram of an embodiment in which a plurality of hardware devices 108A and 108B are coupled to the host computer system 102. It is noted that although two devices are shown, in various embodiments, any number of devices, including zero devices, may be coupled to the host computer system 102. In various embodiments, each of the devices 108 may comprise any type of device which is operable to couple to a computer, including, but not limited to, any of the devices shown in FIGS. 2A-2C, and described above. It is further noted that in various embodiments, the devices 108 may be coupled to the computer system by any of various transmission media, including analog and/or digital transmission cables, wireless means, through a network, or via expansion slots in the computer system 102, among others.

As FIG. 3A shows, each of the devices 108 may store corresponding patent marking information 111 wherein the patent marking information 111 includes patent information (patent numbers) of technology or inventions comprised in the respective device. In other words, device 108A may store corresponding patent marking information 111A, and device 108B may store corresponding patent marking information 111B. Thus, if device 108A includes technology covered by three patents, the corresponding patent marking information 111A may include the patent numbers of the three patents.

Additionally, in this embodiment, a plurality of programs 109A and 109B may be comprised in a memory medium of the host computer system 102. It is noted that although two programs 109 are shown, in various embodiments, any number of programs 109, including zero programs, may be stored in the memory medium of the host computer system 102. As FIG. 3A shows, in this embodiment, each of the programs 109 may store or include respective patent marking information 111. In other words, program 109A may store corresponding patent marking information 111C, and program 109B may store corresponding patent marking information 111D. Thus, if program 109A includes technology covered by three patents, for example, the corresponding patent marking information 111C may include the patent numbers of the three patents.

It is further noted that one or more of the devices 108 coupled to or installed in the computer system 102 may include one or more programs 109 which may also have corresponding patent marking information.

The patent marking information 111 for each resource, i.e., for each device 108 or program 109, preferably includes one or more patent numbers for the resource. For example, if device 108A comprises technology which is covered by three different patents, then the patent marking information 111A may include the patent numbers of the three patents. In one embodiment, the patent marking information 111 may include status information indicating that a patent is pending, i.e., has not been issued yet. For example, the patent marking information may include the phrase "pat. pending" or the equivalent.

In a preferred embodiment, the host computer system 102 may store patent marking software which may be executable to detect the resources, retrieve the respective patent marking information from each resource, and display the patent marking information, as will be described in more detail below. In one embodiment, the patent marking software may comprise part of a configuration software program, as described in more detail below.

FIG. 3B is a block diagram of an embodiment in which hardware devices 108C and 108D are coupled to the host computer system 102. Additionally, in this embodiment, programs 109C and 109D are comprised in the memory medium of the host computer system 102.

As FIG. 3B shows, in this embodiment, the patent marking information 111E for each resource (i.e., the hardware devices 108C and 108D and the programs 109C and 109D) may be stored or included in the computer system 102. For example, in one embodiment, the patent marking information 111E may be stored in a patent marking database comprised in the memory medium of the computer 102.

In this embodiment, the host computer system 102 may execute the patent marking software to detect the resources, retrieve the respective patent marking information for each resource from the patent marking database on the computer 102, and display the patent marking information, as will be described in more detail below.

FIG. 3C is a block diagram of an embodiment in which hardware devices 108C and 108D are coupled to the host computer system 102, and programs 109C and 109D are comprised in the memory medium of the host computer system 102, as in the system of FIG. 3B above. Furthermore, as FIG. 3C shows, in one embodiment, a server 103 may also be coupled to the computer system 102. The server 103 may be coupled to the computer 102 by various means, including one or more of serial or parallel cables, wireless means, or via a network 204, such as the Internet, as shown.

As FIG. 3C shows, in this embodiment, the patent marking information 111E for each resource (i.e., the hardware devices 108C and 108D and the programs 109C and 109D) may be stored in the server computer 103. For example, in one embodiment, the patent marking information 111E may be stored in a patent marking database comprised in the memory medium of the server computer 103. The host computer system 102 may be operable to access the server 103 to retrieve patent marking information for the resources.

Thus, in this embodiment, the host computer system 102 may execute the patent marking software to detect the resources, retrieve the respective patent marking information for each resource from the patent marking database on the server 103, and display the patent marking information, as will be described in more detail below.

Figure 4A:
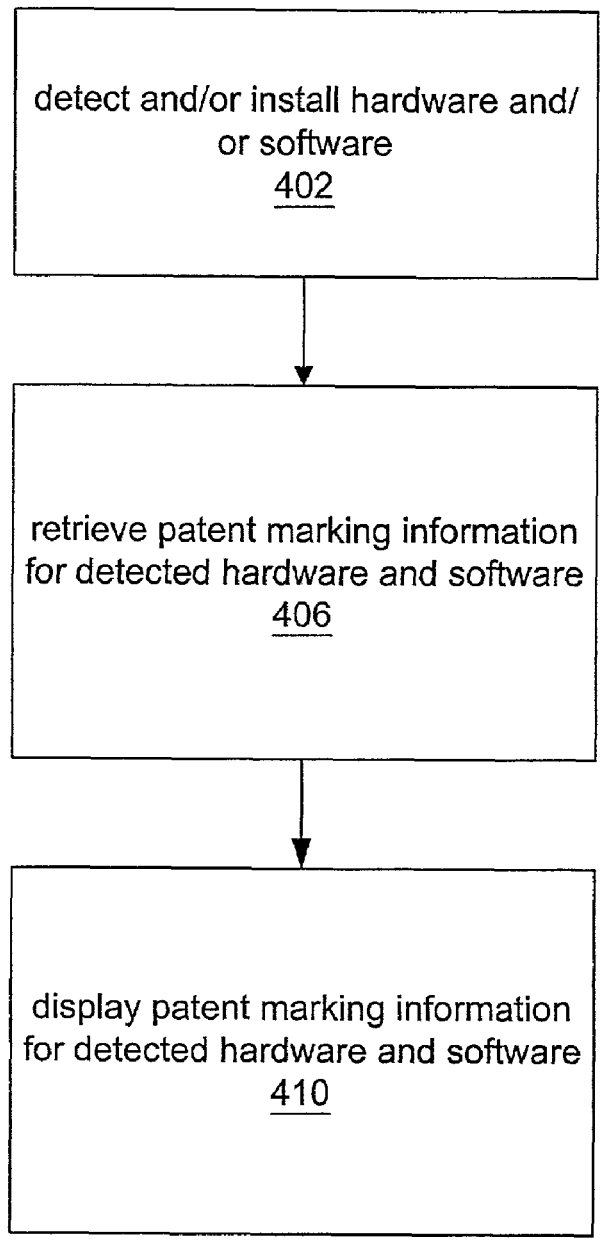
FIGS. 4A-4C flowchart various embodiments of a method for displaying patent marking information.
Figure 4B:
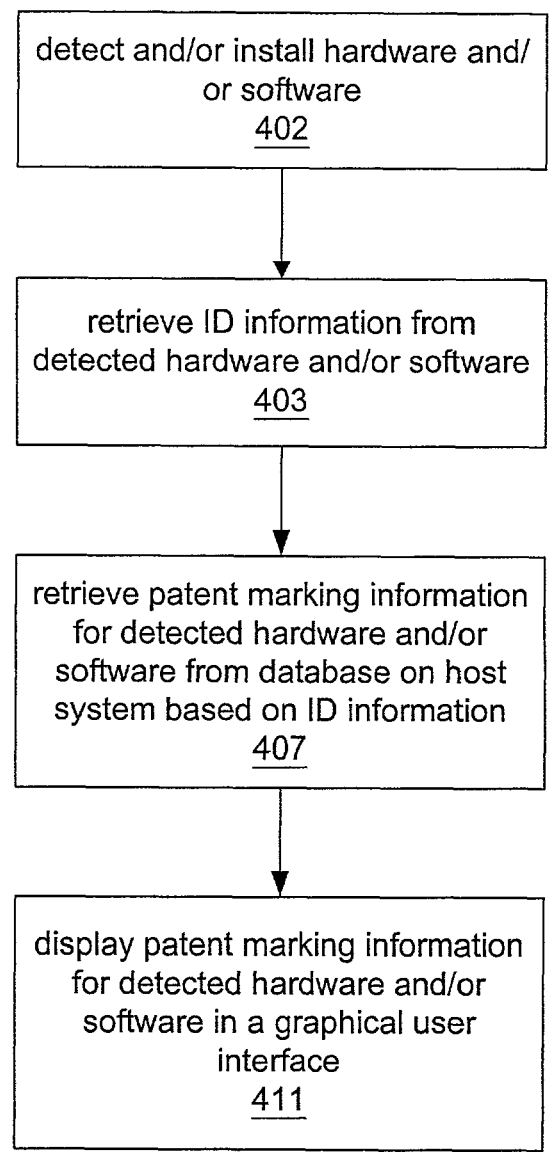
Figure 4C:
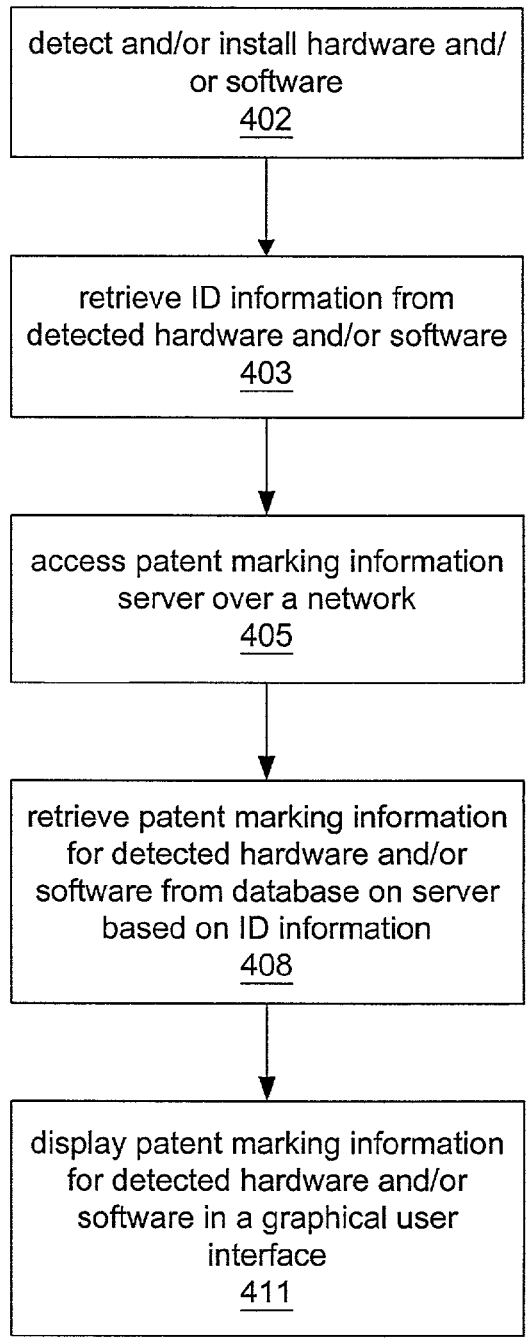

FIGS. 4A-4C—Flowcharts of a Method for Displaying Patent Marking Information FIGS. 4A-4C are flowcharts of various embodiments of a method for displaying patent marking information for resources coupled to or comprised in a computer system.

The method as described may be implemented by any of the systems described above with reference to FIGS. 1A-3C, among others.

FIG. 4A is a high-level flowchart of one embodiment of a method for displaying patent marking information for resources coupled to or comprised in a computer system. FIGS. 4B and 4C are more detailed flowcharts of embodiments of the method of FIG. 4A. It is noted that in various embodiments, some of the steps may be performed in a different order than shown or may be omitted, as desired. Additional steps may also be performed.

As FIG. 4A shows, in 402, one or more resources, i.e., hardware and/or programs, may be detected on the computer system 102. The resources may be detected by "plug and play" software and/or other equivalent software for detecting resources. Alternatively, the detection of the resources may be performed by patent marking software executed by the processor of the computer system 102. The resources may be detected after installing all or a subset of the one or more resources, or every time the computer system boots.

As mentioned above, the computer system may have various types of resources, including programs and/or hardware devices. In one embodiment, the resources detected and/or installed may include one or more programs which may be stored in a memory medium of the computer system 102. In another embodiment, one or more programs may be stored in a memory medium of a device coupled to the computer system 102, for example, on one or more of the hardware devices mentioned above. In a further embodiment, the detected programs may include one or more hardware configuration programs which may be loaded or installed on a programmable hardware element comprised in the computer system 102 or in a hardware device coupled to the computer system 102. The hardware configuration programs may included patented technology, and therefore may have associated patent marking information which may be retrieved and displayed, as described herein.

In one embodiment, one of the detected hardware devices may comprise a chassis which may couple to the computer 102 via a transmission medium, and which may include one or more slots for receiving cards or cartridges, e.g., instrumentation cards. One or more other of the detected hardware devices may comprise cards or cartridges which are operable to be inserted into respective slots in the chassis. Furthermore, the cards or cartridges may include one or more programs with associated patent marking information, as described above.

After the detection of the resources of 402, patent marking information 111 corresponding to each of the one or more resources may be retrieved, as indicated in 406. In an embodiment corresponding to FIG. 3A, described above, in which the patent marking information 111 for each resource is stored in the resource, the patent marking software may retrieve the respective patent marking information from each resource.

In one embodiment, the one or more resources may each store identification (ID) information which identifies the respective resource. In this embodiment, the ID information for each resource may be retrieved after, or as part of, the detection of 402, as indicated in FIGS. 4B and 4C, step 403.

In an embodiment corresponding to the system of FIG. 3B, described above, in which the patent marking information 111 for each resource is stored in a memory medium of the host computer system 102, e.g., in a patent marking database stored therein, the patent marking software may retrieve the respective patent marking information for each resource from the patent marking database stored on the host computer system 102 based on the ID information. For example, the ID information may be used to index into the patent marking database for retrieval of the corresponding patent marking information.

In an embodiment corresponding to the system of FIG. 3C, described above, in which the patent marking information 111 for each resource is stored in a memory medium of a server computer 103 coupled to the host computer system 102 via a network, i.e., in a patent marking database stored on the server computer 103, the patent marking software may access the server 103, as shown in FIG. 4C, step 405. Then, as indicated in 408 of FIG. 4C, the respective patent marking information 111E for each resource may be retrieved from the patent marking database stored on the server computer system 103 based on the ID information.

Various combinations of the three embodiments described above are also contemplated. For example, in one embodiment, the patent marking information pertaining to the hardware devices 108 may be stored in the respective hardware devices, while the patent marking information pertaining to the various programs 109 may be stored in a patent marking database stored in the memory medium of the host computer 102 or the server computer 103. Alternatively, the patent marking information pertaining to the programs 109 may be stored in the patent marking database stored in the memory medium of the host computer 102 or the server computer 103, while the patent marking information pertaining to the various devices 108 may be stored in the respective hardware devices. It is noted that these two combinations are but exemplary embodiments, and that any other combinations may also be used for the storage and retrieval of patent marking information for the one or more resources.

As note above, the patent marking database may be updated periodically. For example, the computer system which stores the patent marking database (i.e., the host computer 102 or the server computer 103) may access another server computer system periodically to request and download updated patent marking information, such as patent marking information for new devices and/or software products. In one embodiment, the patent marking database may be updated when resources are detected whose patent marking information is not stored in the patent marking database. Thus, when a new resource, such as a device or program, is detected and/or installed, the patent marking software may determine that the resource is not represented in the patent marking database, and may then initiate the update process in response.

After the retrieval of the patent marking information of 406, the patent marking information may be displayed, as indicated in 410. In other words, the patent marking software may execute to display the retrieved patent marking information on a computer display, such as a computer monitor. In one embodiment, the ID information for each resource may also be displayed. In one embodiment, the patent marking information may be printed out on a printer.

In one embodiment, the patent marking information may be displayed in a Graphical User Interface (GUI) presented on the computer display, as indicated in step 411 of FIGS. 4B and 4C. In other words, the patent marking software may be executable to present a GUI on the computer display which displays the patent marking information. For example, the patent marking information may be displayed in a pop-up dialog box, or the patent marking software may access and display a web site where the patent marking information is displayed. The pop-up dialog box or web site may be operable to close upon receiving user input, e.g., when the user clicks on an "accept" or "go-away" button. The user input terminating display of the patent marking information may be used to indicate that the user has read and understood the patent marking information.

In another embodiment, the GUI may include one or more icons corresponding to the one or more detected resources. As noted above, the patent marking information may be displayed proximate to an icon or other ID information of the respective resource containing the patented invention.

The patent marking information for a detected resource may be displayed for a specified period of time. For example, the patent marking information, or a pop-up dialog box or window which contains the patent marking information, may be displayed for a brief period of time, e.g., 5 seconds, 10 seconds, 30 seconds, 60 seconds, or any other finite period of time, after which the patent marking information may disappear or the dialog box or window may close. Alternatively, the patent marking information for a detected resource may be displayed when a user moves a cursor over an icon corresponding to the resource. The patent marking information may be displayed for as long as the cursor is positioned over the icon or for a preset amount of time.

In one embodiment, the patent marking information may be displayed in a periodic manner. For example, the patent marking information may be displayed every tenth time the resource is detected. For another example, the patent marking information may be displayed based upon a determined probability (e.g., a 10% chance of being displayed each detection).

In another embodiment, the patent marking information may be displayed on the computer display when the detection occurs for the first time. In other words, when the computer system, i.e., the "plug and play" software or patent marking software, detects a resource for the very first time, the patent marking information may be displayed, but upon subsequent detections of the same resource the patent marking information for that resource may not be displayed.

In one embodiment, the detecting, the retrieving, and the displaying described above may be performed upon one or more of 1) a change in the one or more resources coupled to or comprised in the computer system; and 2) a change of user of the computer system. For example, the detecting, retrieving, and displaying may be performed whenever the system (i.e., the "plug and play" software or the patent marking software) determines that a new or different resource has been added, i.e., installed, on the computer system, and/or on a device coupled to the computer system. In one embodiment, a change of user may include one or both of 1) a user logging onto the computer system for the first time; and 2) a first user logging off of the computer system followed by a second user logging onto the computer system.

In one embodiment, the detecting, the retrieving, and the displaying described above may be performed upon one or more of 1) a change in the one or more resources coupled to or comprised in the computer system; and 2) a change of user of the computer system.

For example, the detecting 402, retrieving 406 (407, 408), and displaying 410 (411) may be performed whenever the system (e.g., the patent marking software) determines that a new or different resource has been added, i.e., installed, on the computer system 102, and/or on a device coupled to the computer system 102. In one embodiment, a change of user may include one or both of 1) a user logging onto the computer system for the first time; and 2) a first user logging off of the computer system followed by a second user logging onto the computer system.

In one embodiment, the patent marking software may be part of, or integrated with, a configuration software program which may display icons or menus for detected hardware and software components. One example of a configuration software program is Measurement and Automation Explorer (MAX) from National Instruments Corporation.

The MAX software program may display names and/or icons of measurement hardware and software products and may display corresponding patent marking information, as described herein.

In another embodiment, the patent marking software may be part of an operating system of the computer system 102. Examples of computer operating systems include Solaris from Sun Microsystems, MacOS from Apple Computer, Linux, Unix, and Windows from Microsoft Corporation, among others. The operating system may operate to detect resources, display icons or menus for detected resources, and display corresponding patent marking information as described herein.

In one embodiment, as noted above, the patent marking database may be updated periodically. For example, the computer system which stores the patent marking database (i.e., the host computer or the server computer) may access another server computer system periodically to request and download updated patent marking information (e.g., from various manufacturers or the Patent and Trademark Office), such as patent marking information for new devices and/or software products. In one embodiment, the patent marking database may be updated when resources are detected whose patent marking information is not stored in the patent marking database.

Thus, various embodiments of the method described above may provide for the detection of hardware and/or software resources coupled to or comprised in a computer system, the retrieval of patent marking information corresponding respectively to the resources, and the display of the patent marking information on a computer display.

Figure 5A:
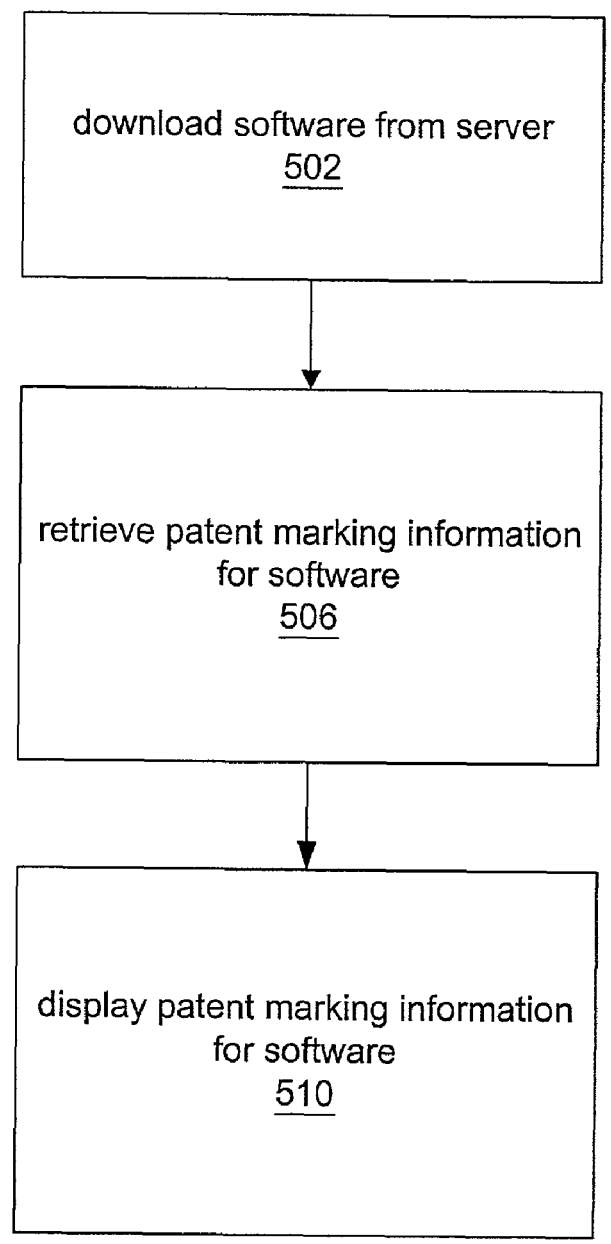
FIGS. 5A-5C flowchart various embodiments of another method for displaying patent marking information.
Figure 5B:
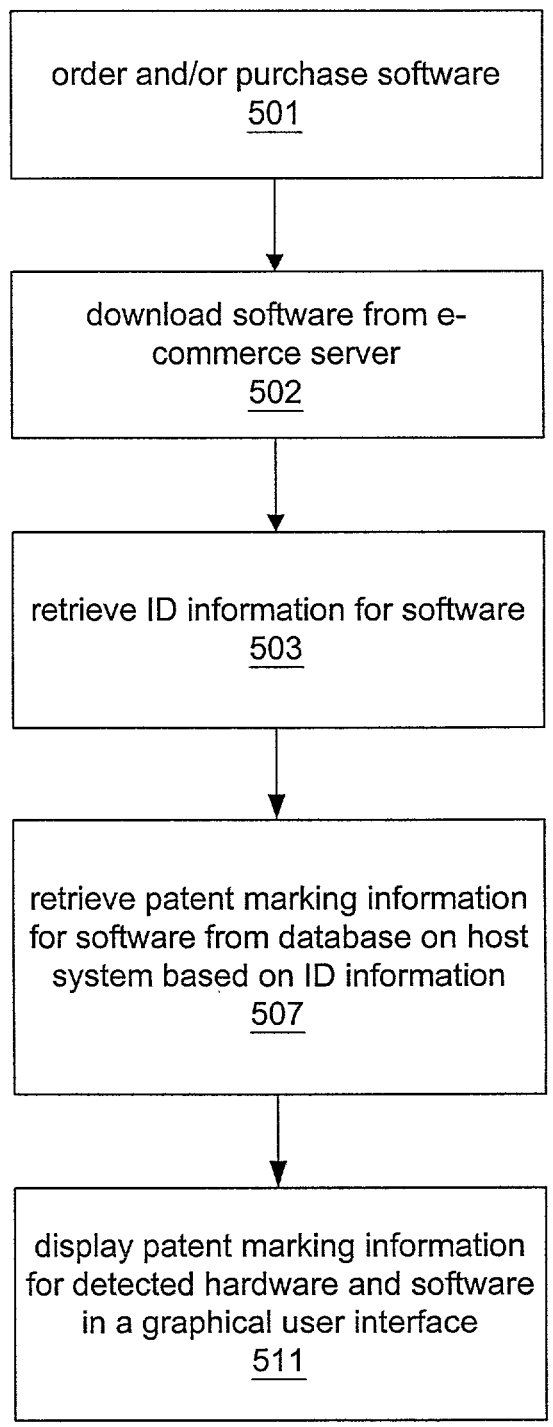
Figure 5C:
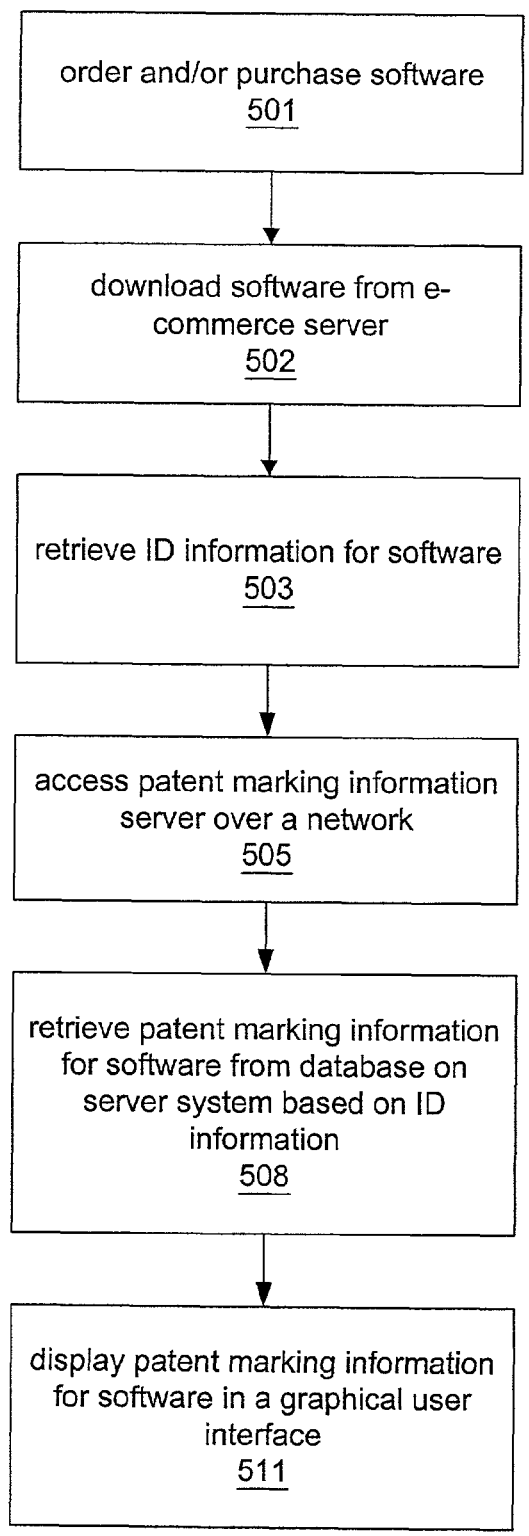

FIGS. 5A-5C—Flowcharts of Another Method for Displaying Patent Marking Information FIGS. 5A-5C flowchart various embodiments of another method for displaying patent marking information. As mentioned before, the method as described may be implemented by any of the systems described above with reference to FIGS. 1A-3C, among others. FIG. 5A is a high-level flowchart of one embodiment of a method for displaying patent marking information for software products which are downloaded to a computer system. As used herein, the terms "program" and "software product" are used interchangeably, and are meant to include applications, driver programs, and hardware configuration files, as noted above. FIGS. 5B and 5C are more detailed flowcharts of embodiments of the method of FIG. 5A. It is noted that in various embodiments, some of the steps may be performed in a different order than shown or may be omitted, as desired. Additional steps may also be performed. When the steps described below are substantially the same as corresponding steps of FIGS. 4A-4C, the descriptions may be abbreviated.

As FIG. 5A shows, in 502, one or more programs may be downloaded to computer system 102 from the server 103, e.g., e-commerce server 103A hosting an e-commerce system, over a network. The programs downloaded may be software programs or hardware configuration programs.

In one embodiment, prior to downloading the one or more programs in 502, an order and/or purchase of the one or more programs may be made, as indicated in step 501 of FIGS. 5B and 5C. For example, the computer system 102 may access the e-commerce server 103A and provide user input specifying the desired programs. In one embodiment, a GUI may be presented to the user to facilitate the ordering/purchasing transaction. In one embodiment, payment information may be provided to the e-commerce system, such as a credit card number or billing account, whereby payment for the one or more programs may be made. In other embodiments, the order/purchase may be made via other means, such as by telephone, email, mail, etc.

In 506, after downloading the one or more programs in 502, patent marking information 111 corresponding to the one or more downloaded programs may be retrieved. In an embodiment corresponding to FIG. 3A, described above, in which the patent marking information 111 for each of the downloaded programs is included in the respective program, the patent marking software may retrieve the respective patent marking information from the program. In other words, the patent marking information may be downloaded along with the one or more programs. In another embodiment, the patent marking information 111 may be downloaded after the programs have been downloaded, i.e., as a separate process, as described below. In one embodiment, the one or more programs may be installed on the computer system 102 prior to the retrieval of the patent marking information.

Similar to the method of FIGS. 4B and 4C, in one embodiment, each program may store identification (ID) information which identifies the respective program. In this embodiment, the ID information for each program may be retrieved after, or as part of, the downloading of 502, as indicated in step 503 of FIGS. 5B and 5C.

In an embodiment corresponding to the system of FIG. 3B, in which the patent marking information 111 for each program is stored in a patent marking database on the host computer system 102, the patent marking software may retrieve the respective patent marking information for each downloaded program from the patent marking database based on the ID information, as indicated in FIG. 5B, step 507.

In an embodiment corresponding to the system of FIG. 3C, where the patent marking database is stored on patent marking information server computer 103B, the patent marking software may access the server 103B, as shown in FIG. 5C, step 505. Then, as indicated in 508 of FIG. 5C, the respective patent marking information for each downloaded program may be retrieved from the patent marking database based on the ID information. In one embodiment, the e-commerce server 103A and the patent marking information server 103B may be the same server computer system 103. Various combinations of the three embodiments described above are also contemplated.

After the retrieval of the patent marking information of 506, the patent marking information, and optionally, ID information, for the downloaded programs or software products may be displayed on a computer display or monitor, as indicated in 510. In one embodiment, the patent marking information may be displayed in a Graphical User Interface (GUI) presented on the computer display, as indicated in step 511 of FIGS. 5B and 5C, various embodiments of which are described in detail above with reference to step 411 of FIGS. 4B and 4C.

In one embodiment, the one or more software products may include one or more of: a software program, such as an application or driver program, and a hardware configuration program, among others. For example, where the software products comprise an application program, the application program may be any type of application program, including, for example, a measurement application, control application, analysis application, machine vision application, motion application, business application, entertainment application, scientific application, medical application, or financial application, among others. Where the software products comprise a driver program, the driver program may be any type of driver, including, for example, a driver for a measurement device, control device, telecommunications device, machine vision device, or any other type of device. In one embodiment, the driver program may also comprise a driver for any of a variety of software application programs.

In one embodiment one of the software products may comprise a hardware configuration program which may be operable to configure a programmable hardware element or reconfigurable logic, such as a field programmable gate array (FPGA). For example, a hardware configuration program may comprise a bit file generated from a netlist or hardware description, which may configure the programmable hardware element to function as any of a variety of devices, e.g., measurement, control, signal processing, automation, machine vision, and communication devices, among others.

In one embodiment, one or more hardware products may be ordered from the e-commerce system prior to downloading the software products. At least one of the software products may comprise configuration information for at least one of the one or more hardware products, e.g., a device which includes a programmable hardware element. Thus, as described above, the user may access an e-commerce server over the network, and indicate the one or more hardware products desired. The user may further provide payment information to the e-commerce system, where the payment information is usable to purchase the one or more ordered hardware products.

In one embodiment, the hardware products may be delivered to the customer prior to downloading the hardware configuration program, for example, so that the hardware configuration program may be downloaded onto the hardware.

EXAMPLE OPERATION

As one example of the operation of an embodiment of the invention, consider a test and measurement system which includes a computer system 102, one or more measurement or automation devices 108 that are coupled to or comprised in the computer system, and one or more measurement software programs 109 that may be stored in a memory of the computer system 102. The computer system 102 may include a configuration program such as Measurement and Automation Explorer (MAX) available from National Instruments Corporation, as mentioned above. The MAX program may include patent marking software according to an embodiment of the invention. Each time the computer is booted, "plug and play" software present in the system may query the system for hardware devices coupled to or comprised in the computer system 102. In addition, other software may be used to discover or detect software programs that are present in the computer system or in any of the devices coupled to the computer system.

This "plug and play" software and/or other software may report these results to MAX. MAX may receive information regarding the hardware devices and/or software programs present in the system and then may query a database of patent marking information that would be relevant to these products. Alternatively, the "plug and play" software and/or other software may actually retrieve patent marking information from the respective devices and software programs and present this information to MAX. As yet another alternative, MAX may receive information on these hardware devices and software programs and then query each of the respective devices and programs for this patent marking information.

Where MAX obtains the patent marking information from a database, MAX may use an ID obtained from each of the respective hardware devices and software programs that is used to index into the patent marking database. It is noted that the patent marking database may be local to (comprised in) the computer system 102 or may be on a server computer system 103 that is coupled to the computer system 102 over a network 204. Once the relevant patent marking information has been discovered, MAX may present this information on its display. For example, the MAX program may show icons for each of the hardware devices and/or software programs present in the system. In this example, MAX may display relevant patent marking information approximate to each of the icons wherein the patent marking information for a respective device or program is displayed proximate to its corresponding icon on the display. This alerts the users as to which patents may apply to the respective devices or programs present in the system.

Thus, various embodiments of the method described above may provide for the retrieval and display of patent marking information for software programs or software products downloaded to a computer system.

Various embodiments of the systems and methods described herein may thus operate to detect hardware and software products coupled to or comprised in a computer system, and to retrieve and display corresponding patent marking information for the detected products.

Although the system and method of the present invention has been described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

I claim:

1. A computer-implemented method for displaying patent marking information, the method comprising:
programmatically detecting one or more resources coupled to or comprised in a computer system;
retrieving, from a memory medium, patent marking information corresponding to each of said one or more resources based on said programmatically detecting, wherein the patent marking information comprises information identifying patents that are applicable to technology of the one or more resources; and
displaying said patent marking information on a display device.

2. The method of claim 1, wherein said one or more resources comprise one or more hardware devices coupled to the computer system.

3. The method of claim 1, wherein said one or more resources comprise one or more software programs installed on the computer system.

4. The method of claim 1, wherein said one or more resources comprise one or more hardware configuration programs configured on a programmable hardware element of a hardware device coupled to or comprised in the computer system.

5. The method of claim 1,
wherein said one or more resources each stores patent marking information; and
wherein said retrieving patent marking information comprises retrieving said patent marking information respectively from each of said one or more resources.

6. The method of claim 1,
wherein said one or more resources each stores identification (ID) information which identifies the respective resource;
wherein said detecting comprises retrieving said ID information; and
wherein said retrieving patent marking information is performed based on said ID information.

7. The method of claim 6, wherein said retrieving patent marking information comprises retrieving said patent marking information from a patent marking database comprised in the computer system.

8. The method of claim 7, further comprising:
updating said patent marking database periodically.

9. The method of claim 7, further comprising:
updating said patent marking database when resources are detected whose patent marking information is not stored in said patent marking database.

10. The method of claim 6, wherein said retrieving patent marking information comprises retrieving said patent marking information from a database comprised in a server computer, wherein the server computer is coupled to the computer system via a network.

11. The method of claim 6, wherein said displaying said patent marking information further comprises displaying said ID information for each resource.

12. The method of claim 1, wherein said displaying said patent marking information comprises displaying said patent marking information on a computer display for a specified period of time.

13. The method of claim 1, wherein said displaying said patent marking information comprises displaying said patent marking information on a computer display when said detection occurs for the first time.

14. The method of claim 1, wherein said displaying said patent marking information on a computer display is performed in a periodic manner.

15. The method of claim 1, wherein said displaying said patent marking information on a computer display comprises displaying said patent marking information in a Graphical User Interface (GUI) presented on said computer display.

16. The method of claim 15, wherein said displaying said patent marking information in a Graphical User Interface comprises:
displaying said patent marking information in a pop-up dialog box, wherein said pop-up dialog box is operable to close upon receiving user input.

17. The method of claim 15,
wherein said GUI includes one or more icons corresponding to said one or more resources, wherein said displaying said patent marking information comprises:
displaying patent marking information for a first resource of said one or more resources when a user moves a cursor over an icon corresponding to said first resource.

18. The method of claim 15,
wherein said GUI includes one or more icons corresponding to said one or more resources, wherein said displaying said patent marking information comprises:
displaying the patent marking information for each resource proximate to the respective icon of each resource.

19. The method of claim 1, wherein said detecting, said retrieving, and said displaying are performed by a configuration software program executing on the computer system.

20. The method of claim 1, wherein said detecting, said retrieving, and said displaying are performed by an operating system executing on the computer system.

21. The method of claim 1, wherein said detecting, said retrieving, and said displaying are performed upon one or more of:
a change in the one or more resources coupled to or comprised in the computer system; and
a change of user of the computer system.

22. The method of claim 21, wherein said change of user comprises one or both of:
a user logging onto the computer system for the first time; and
a first user logging off of the computer system followed by a second user logging onto the computer system.

23. The method of claim 1, wherein said detecting one or more resources comprises:
executing "plug and play" software to detect the one or more resources.

24. A system for displaying patent marking information, the system comprising:
a computer system, comprising:
a memory which is operable to store program instructions;
a processor coupled to said memory; and
a display coupled to said processor and to said memory; and
one or more resources coupled to or comprised in the computer system;
wherein said program instructions are executable by said processor to perform:
detecting said one or more resources;
retrieving patent marking information corresponding respectively to each of said one or more resources based on said detecting, wherein the patent marking information comprises information identifying patents that are applicable to technology of the one or more resources; and displaying said patent marking information on said display.

25. The system of claim 24, wherein said one or more resources comprise one or more of:
- one or more hardware devices coupled to the computer system; and
- one or more software programs installed on the computer system.

26. The system of claim 24, wherein said one or more resources comprise one or more hardware configuration programs configured on a programmable hardware element of a hardware device coupled to or comprised in the computer system.

27. The system of claim 24,
- wherein said one or more resources each comprise patent marking information; and
- wherein said retrieving patent marking information comprises retrieving said patent marking information respectively from each of said one or more resources.

28. The system of claim 24,
- wherein said one or more resources each includes identification (ID) information which identifies the respective resource;
- wherein said detecting comprises retrieving said ID information; and
- wherein said retrieving patent marking information is performed based on said ID information.

29. The system of claim 28,
- wherein said memory further stores a patent marking database; and
- wherein said retrieving patent marking information comprises retrieving said patent marking information from said patent marking database.

30. The system of claim 28, further comprising:
- a server computer coupled to the computer system via a network, wherein said server computer stores a database of patent marking information;
- wherein said retrieving patent marking information comprises retrieving said patent marking information from said database comprised in the server computer.

31. The system of claim 24,
- wherein said program instructions are further executable to implement a Graphical User Interface (GUI), wherein said GUI is presented on said display; and
- wherein said displaying said patent marking information on said display comprises displaying said patent marking information in said GUI presented on said display.

32. The system of claim 31,
- wherein said GUI includes one or more icons corresponding to said one or more resources, wherein said displaying said patent marking information comprises:
  - displaying patent marking information for a first resource of said one or more resources when a user moves a cursor over an icon corresponding to said first resource.

33. The system of claim 24,
- wherein said GUI includes one or more icons corresponding to said one or more resources, wherein said displaying said patent marking information comprises:
  - displaying the patent marking information for each resource proximate to the respective icon of each resource.

34. The system of claim 24, wherein said program instructions are comprised in a configuration software program, and wherein said detecting, said retrieving, and said displaying are performed by the configuration software program executing on the computer system.

35. The system of claim 24, wherein said program instructions are comprised in an operating system executing on the computer system, and wherein said detecting, said retrieving, and said displaying are performed by said operating system.

36. A memory medium which is operable to store program instructions, wherein said program instructions are executable by a processor to perform:
- detecting one or more resources coupled to or comprised in a computer system;
- retrieving patent marking information corresponding respectively to each of said one or more resources based on said detecting, wherein the patent marking information comprises information identifying patents that are applicable to technology of the one or more resources; and
- displaying said patent marking information on a display.

37. The memory medium of claim 36, wherein said one or more resources comprise one or more hardware devices coupled to the computer system.

38. The memory medium of claim 36, wherein said one or more resources comprise one or more software programs installed on the computer system.

39. The memory medium of claim 36, wherein said one or more resources comprise one or more hardware configuration programs configured on a programmable hardware element of a hardware device coupled to or comprised in the computer system.

40. The memory medium of claim 36,
- wherein said one or more resources each stores patent marking information; and
- wherein said retrieving patent marking information comprises retrieving said patent marking information respectively from each of said one or more resources.

41. The memory medium of claim 36,
- wherein said one or more resources each stores identification (ID) information which identifies the respective resource;
- wherein said detecting comprises retrieving said ID information; and
- wherein said retrieving patent marking information is performed based on said ID information.

42. The memory medium of claim 41,
- wherein said memory medium further stores a patent marking database; and
- wherein said retrieving patent marking information comprises retrieving said patent marking information from said patent marking database.

43. The memory medium of claim 42, wherein said program instructions are further executable to perform:
- updating said patent marking database periodically.

44. The memory medium of claim 42, wherein said program instructions are further executable to perform:
- updating said patent marking database when resources are detected whose patent marking information is not stored in said patent marking database.

45. The memory medium of claim 41, wherein said program instructions are further executable to perform:
- accessing a server computer coupled to the computer system via a network, wherein said server computer stores a database of patent marking information;
- wherein said retrieving patent marking information comprises retrieving said patent marking information from said database comprised in the server computer.

46. The memory medium of claim 41, wherein said displaying said patent marking information further comprises displaying said ID information for each resource.

47. The memory medium of claim 36, wherein said displaying said patent marking information comprises displaying said patent marking information for a specified period of time.

48. The memory medium of claim 36, wherein said displaying said patent marking information comprises displaying said patent marking information when said detection occurs for the first time.

49. The memory medium of claim 36,
wherein said program instructions are further executable to implement a Graphical User Interface (GUI), wherein said GUI is displayed on said display; and
wherein said displaying said patent marking information comprises displaying said patent marking information in said GUI.

50. The memory medium of claim 49, wherein said displaying said patent marking information in a Graphical User Interface comprises:
displaying said patent marking information in a pop-up dialog box, wherein said pop-up dialog box is operable to close upon receiving user input.

51. The memory medium of claim 49,
wherein said GUI includes one or more icons corresponding to said one or more resources, wherein said displaying said patent marking information comprises:
displaying patent marking information for a first resource of said one or more resources when a user moves a cursor over an icon corresponding to said first resource.

52. The memory medium of claim 49,
wherein said GUI includes one or more icons corresponding to said one or more resources, wherein said displaying said patent marking information comprises:
displaying the patent marking information for each resource proximate to the respective icon of each resource.

53. The memory medium of claim 36, wherein said program instructions are comprised in a configuration software program, and wherein said detecting, said retrieving, and said displaying are performed by the configuration software program executing on the computer system.

54. The memory medium of claim 36, wherein said program instructions are comprised in an operating system executing on the computer system, and wherein said detecting, said retrieving, and said displaying are performed by said operating system.

55. The memory medium of claim 36, wherein said detecting one or more resources comprises:
executing "plug and play" software to detect the one or more resources.

56. The memory medium of claim 36, wherein said detecting, said retrieving, and said displaying are performed upon one or more of:
a change in the one or more resources coupled to or comprised in the computer system; and
a change of user of the computer system.

57. The memory medium of claim 56, wherein said change of user comprises one or both of:
a user logging onto the computer system for the first time; and
a first user logging off of the computer system followed by a second user logging onto the computer system.

58. A computer based method for displaying patent marking information, the method comprising:
receiving user input to purchase one or more software products from an e-commerce server, wherein the user input is received over a network;
downloading the one or more software products to a computer system from the e-commerce server over the network;
retrieving patent marking information corresponding to each of said one or more software products based on the user input, wherein the patent marking information comprises information identifying patents that are applicable to technology of the one or more software products; and
displaying said patent marking information on a display device.

59. The method of claim 58, further comprising:
installing said one or more software products prior to said retrieving.

60. The method of claim 58, wherein said retrieving patent marking information corresponding to each of said one or more software products comprises:
retrieving identification (ID) information from each of said one or more software products; and
retrieving patent marking information corresponding to each of said one or more software products based on said ID information.

61. The method of claim 60, wherein said displaying said patent marking information further comprises displaying said ID information for each software product.

62. The method of claim 58,
wherein said one or more software products each comprises patent marking information; and
wherein said retrieving patent marking information comprises retrieving said patent marking information respectively from each of said one or more software products.

63. The method of claim 58, wherein said retrieving patent marking information comprises retrieving said patent marking information from a database comprised in the computer system.

64. The method of claim 58, wherein said retrieving patent marking information comprises retrieving said patent marking information from a database comprised in the e-commerce server.

65. The method of claim 58, wherein said retrieving patent marking information comprises retrieving said patent marking information from a database comprised in a second different server computer, wherein the second server computer is coupled to the computer system via a network.

66. The method of claim 58, wherein said one or more software products comprises a hardware configuration program for configuring a programmable hardware element comprised in a hardware device coupled to the computer system.

67. The method of claim 58, wherein said displaying said patent marking information comprises displaying said patent marking information on a computer display for a period of time.

68. The method of claim 58, wherein said displaying said patent marking information on a computer display comprises displaying said patent marking information in a Graphical User Interface (GUI) presented on a computer display.

69. The method of claim 68, wherein said displaying said patent marking information in a Graphical User Interface comprises:
displaying said patent marking information in a pop-up dialog box, wherein said pop-up dialog box is operable to close upon receiving user input.

70. The method of claim 68,
wherein said GUI is operable to display icons corresponding to said one or more software products, wherein said displaying said patent marking information comprises:
displaying patent marking information for a first software product of said one or more software products when a user moves a cursor over an icon corresponding to said first software product.

71. The method of claim 68,
wherein said GUI includes one or more icons corresponding to said one or more software products, wherein said displaying said patent marking information comprises:
displaying the patent marking information for each software product proximate to the respective icon of each software product.

72. The method of claim 58, wherein said retrieving and said displaying are performed by a configuration software program executing on the computer system.

73. The method of claim 58, wherein said retrieving and said displaying are performed by an operating system executing on the computer system.

74. The method of claim 58, wherein said receiving user input further comprises:
providing payment information to said e-commerce server, wherein said payment information is usable to purchase said one or more software products.

75. The method of claim 58, wherein said one or more software products includes one or more of:
an application program;
a driver program; and
a hardware configuration program.

76. The method of claim 58, further comprising:
ordering one or more hardware products prior to said downloading;
wherein at least one of said one or more software products comprises configuration information for at least one of said one or more hardware products.

77. The method of claim 76, wherein said at least one of said one or more hardware products comprises a programmable hardware element, and wherein said configuration information comprises a hardware configuration program for said programmable hardware element.

78. The method of claim 76, wherein said ordering said one or more hardware products prior to said downloading comprises:
accessing the e-commerce server over the network; and
indicating said one or more hardware products.

79. The method of claim 78, wherein said ordering said one or more hardware products prior to said downloading further comprises:
providing payment information to said e-commerce server, wherein said payment information is usable to purchase said one or more hardware products.

80. A system for displaying patent marking information, the system comprising:
a computer system, comprising:
a memory which is operable to store patent marking software and one or more software programs;
a processor coupled to said memory; and
a display coupled to said processor and to said memory;
wherein said patent marking software is executable by said processor to perform:
detecting said one or more software programs;
retrieving patent marking information corresponding respectively to each of said one or more software programs in response to said detecting, wherein the patent marking information comprises information identifying patents that are applicable to technology of the one or more software programs; and
displaying said patent marking information on said display.

81. The system of claim 80,
wherein each of said one or more software programs includes patent marking information;
wherein said retrieving patent marking information comprises retrieving said patent marking information from said one or more software programs.

82. The system of claim 80,
wherein said memory is further operable to store a patent marking database;
wherein each of said one or more software programs includes identification (ID) information; and
wherein said retrieving patent marking information comprises:
retrieving said ID information from each of said one or more software programs; and
retrieving said patent marking information from said patent marking database based on said ID information.

83. A system for displaying patent marking information, the system comprising:
a computer system, comprising:
a memory which is operable to store patent marking software and one or more software programs;
a processor coupled to said memory; and
a display coupled to said processor and to said memory; and
a server computer coupled to the computer system via a network, wherein said server computer stores a patent marking database;
wherein said patent marking software is executable by said processor to perform:
detecting said one or more software programs, wherein said detecting comprises identifying each of said one or more software programs;
retrieving patent marking information corresponding respectively to each of said one or more software programs from said patent marking database in response to said identifying, wherein the patent marking information comprises information identifying patents that are applicable to technology of the one or more software programs; and
displaying said patent marking information on said display.

84. A system for displaying patent marking information, the system comprising:
a computer system, comprising:
a memory which is operable to store patent marking software;
a processor coupled to said memory; and
a display coupled to said processor and to said memory;
one or more hardware devices coupled to said computer system; and
wherein said patent marking software is executable by said processor to perform:
detecting said one or more hardware devices, wherein said detecting comprises identifying each of said one or more hardware devices;
retrieving patent marking information corresponding respectively to each of said one or more hardware devices in response to said identifying, wherein the patent marking information comprises information identifying patents that are applicable to technology of the one or more hardware devices; and displaying said patent marking information on said display.

85. The system of claim 84, wherein each of said one or more hardware devices stores patent marking information;

wherein said retrieving patent marking information comprises retrieving said patent marking information from said one or more hardware devices.

86. The system of claim 84, wherein said memory is further operable to store a patent marking database;

wherein each of said one or more hardware devices stores identification (ID) information; and wherein said retrieving patent marking information comprises:

retrieving said ID information from each of said one or more hardware devices; and retrieving said patent marking information from said patent marking database based on said ID information.

87. A system for displaying patent marking information, the system comprising:

means for receiving user input to purchase one or more software products from an e-commerce server, wherein the user input is received over a network;

means for downloading the one or more software products from the e-commerce server computer system to a host computer system over the network;

means for retrieving patent marking information corresponding respectively to each of said one or more software products based on the user input, wherein the patent marking information comprises information identifying patents that are applicable to technology of the one or more software products; and means for displaying said patent marking information.

88. The system of claim 87, wherein said one or more software products each comprise patent marking information; and wherein said retrieving patent marking information comprises retrieving said patent marking information respectively from each of said one or more software products.

89. The system of claim 87, wherein said one or more software products each includes identification (ID) information which identifies the respective resource;

wherein said detecting comprises retrieving said ID information; and wherein said retrieving patent marking information is performed based on said ID information.

90. A memory medium which is operable to store program instructions, wherein said program instructions are executable by a processor to perform:

receiving user input to purchase one or more software products from an e-commerce server, wherein the user input is received over a network;

downloading the one or more software products from the e-commerce server to a host computer system;

retrieving patent marking information corresponding respectively to each of said one or more software products based on the user input, wherein the patent marking information comprises information identifying patents that are applicable to technology of the one or more software products; and displaying said patent marking information on a display.

91. A system for displaying patent marking information, the system comprising:

a computer system, comprising:

a memory which is operable to store patent marking software;

a processor coupled to said memory; and a display coupled to said processor and to said memory;

one or more hardware devices coupled to said computer system; and a server computer coupled to the computer system via a network, wherein said server computer stores a patent marking database;

wherein said patent marking software is executable by said processor to perform:

detecting said one or more hardware devices, wherein said detecting comprises identifying each of said one or more hardware devices;

retrieving patent marking information corresponding respectively to each of said one or more hardware devices from said patent marking database in response to said identifying, wherein the patent marking information comprises information identifying patents that are applicable to technology of the one or more hardware devices; and displaying said patent marking information on said display.

92. A system for displaying patent marking information, the system comprising:

means for detecting one or more resources coupled to or comprised in a computer system;

means for retrieving patent marking information corresponding respectively to each of said one or more resources based on said detecting, wherein the patent marking information comprises information identifying patents that are applicable to technology of the one or more resources; and means for displaying said patent marking information.

93. The system of claim 92, wherein said one or more resources comprise one or more hardware devices coupled to the computer system.

94. The system of claim 92, wherein said one or more resources comprise one or more software programs installed on the computer system.

95. The system of claim 92, wherein said one or more resources comprise one or more hardware configuration programs configured on a programmable hardware element of a hardware device coupled to or comprised in the computer system.

96. The system of claim 92, wherein said one or more resources each comprise patent marking information; and wherein said retrieving patent marking information comprises retrieving said patent marking information respectively from each of said one or more resources.

97. The system of claim 92, wherein said one or more resources each includes identification (ID) information which identifies the respective resource;

wherein said detecting comprises retrieving said ID information; and wherein said retrieving patent marking information is performed based on said ID information.

98. A system for displaying patent marking information, the system comprising:

a computer system, comprising:

a memory which is operable to store patent marking software and one or more software programs;

a processor coupled to said memory; and a display coupled to said processor and to said memory;

wherein said patent marking software is executable by said processor to perform:

receiving user input to purchase one or more software products from an e-commerce server, wherein the user input is received over a network;

downloading said one or more software programs from the e-commerce server;

retrieving patent marking information corresponding respectively to each of said one or more software programs, wherein the patent marking information comprises information identifying patents that are applicable to technology of the one or more software products; and displaying said patent marking information on said display.

99. The system of claim 98, wherein each of said one or more software programs includes patent marking information;

wherein said retrieving patent marking information comprises retrieving said patent marking information from said one or more software programs.

100. The system of claim 98, wherein said memory is further operable to store a patent marking database;

wherein each of said one or more software programs includes identification (ID) information; and wherein said retrieving patent marking information comprises:

retrieving said ID information from each of said one or more software programs; and retrieving said patent marking information from said patent marking database based on said ID information.

101. The system of claim 98, wherein said server computer system is operable to store a patent marking database;

wherein each of said one or more software programs includes identification (ID) information; and wherein said retrieving patent marking information comprises:

retrieving said ID information from each of said one or more software programs;

accessing said server computer system; and retrieving said patent marking information from said patent marking database based on said ID information.

102. The system of claim 98, further comprising:

a patent marking information server computer system coupled to said computer system via a network;

wherein said patent marking information server computer system stores a patent marking database;

wherein each of said one or more software programs includes identification (ID) information; and wherein said retrieving patent marking information comprises:

retrieving said ID information from each of said one or more software programs;

accessing said patent marking information server computer system; and retrieving said patent marking information from said patent marking database based on said ID information.

* * * * *